(12) United States Patent
Tockert et al.

(10) Patent No.: US 9,058,033 B2
(45) Date of Patent: Jun. 16, 2015

(54) COMPUTER SYSTEM AND METHOD FOR CONTROLLING CHARGING OF A BLAST FURNACE BY MEANS OF A USER INTERFACE

(75) Inventors: Paul Tockert, Berbourg (LU); Damien Meyer, Ennery (FR); Fabrice Hansen, Doncols (LU)

(73) Assignee: PAUL WURTH S.A., Luxembourg (LU)

( * ) Notice: Subject to any disclaimer, the term of this patent is extended or adjusted under 35 U.S.C. 154(b) by 767 days.

(21) Appl. No.: 13/145,614

(22) PCT Filed: Jan. 28, 2010

(86) PCT No.: PCT/EP2010/051015

§ 371 (c)(1),
(2), (4) Date: Jul. 21, 2011

(87) PCT Pub. No.: WO2010/086379

PCT Pub. Date: Aug. 5, 2010

(65) Prior Publication Data

US 2011/0282494 A1    Nov. 17, 2011

(30) Foreign Application Priority Data

Jan. 28, 2009  (LU) .......................................... 91520

(51) Int. Cl.
*C21B 5/00* (2006.01)
*G05B 19/418* (2006.01)
(Continued)

(52) U.S. Cl.
CPC .......... *G05B 19/41865* (2013.01); *C21B 5/008* (2013.01); *C21B 7/20* (2013.01);
(Continued)

(58) Field of Classification Search
CPC ............ C21B 5/008; C21B 7/00; C21B 7/20; C21B 2300/04; G06Q 10/06; F27B 1/20; F27B 1/28; F27B 1/00; G05B 2219/13144; G05B 19/41865; F27D 3/10; F27D 19/00; F27D 21/00; F27D 3/0025
USPC ..................................... 700/266, 274; 702/31
See application file for complete search history.

(56) References Cited

U.S. PATENT DOCUMENTS 4,466,825 A * 8/1984 Kondo et al. .................... 75/375
4,670,049 A * 6/1987 Kelmar ........................... 75/464
(Continued)

FOREIGN PATENT DOCUMENTS

JP    55028308 A    2/1980
JP    7268413 A    10/1995

OTHER PUBLICATIONS

International Search Report PCT/EP2010; Dated Apr. 21, 2010.
(Continued)

*Primary Examiner* — Shogo Sasaki
(74) *Attorney, Agent, or Firm* — Cantor Colburn LLP

(57) ABSTRACT

The invention relates to computer-implemented charging of a blast furnace equipped with an automated top-charging installation and stockhouse for batchwise charging. It proposes: obtaining a nominal charge dataset reflecting a nominal blast furnace charge and comprising plural charge material records, each charge material record comprising a material type and an associated nominal charge quantity; generating a graphical user interface comprising batch data fields for entering and displaying plural batch datasets for pre-configuring batches, each batch dataset comprising at least one batching record, each batching record comprising a material type and an associated batching proportion. According to the invention, the batching proportion associated to a material type in a batching record is used for predefining a ratio between the material quantity that is to be contained in a batch and the nominal charge quantity. Further according to the invention, the method comprises computing, for the respective material type of each batching record, based on the batching proportion and the nominal charge quantity associated to the respective material type, an associated batching quantity which the stockhouse is to provide in a batch as pre-configured by the batch dataset.

27 Claims, 12 Drawing Sheets

| Batch | Type | Average density | Expect. Weight | Wall Centre | Discharge time | Start Angle | Angle incr. |
|---|---|---|---|---|---|---|---|
| 1 | O | 2000 | 15500 | W | 120 | 90 | +20 |
| ... | | | | | | | |
| 20 | | | | | | | |

| Batch | t11 | t10 | ... | t1 | tCC | w11 | w10 | ... | w1 | wCC |
|---|---|---|---|---|---|---|---|---|---|---|
| 1 | 2 | 3 | | 1 | | 2 | 3 | | 1 | |
| ... | | | | | | | | | | |
| 20 | | | | | | | | | | |

| Batch | MG 11_10 | MG_10_09 | ... | MG_02_01 | MG_01_CC |
|---|---|---|---|---|---|
| 1 | N | N | | Y | Y |
| ... | | | | | |
| 20 | | | | | |

| Batch | MG 1 FR 0 | MG 1 FR 0.05 | ... | MG 1 FR 0.75 | MG 1 FR 0.8 |
|---|---|---|---|---|---|
| 1 | 0 | 5.0 | | 40.1 | 41.0 |
| ... | | | | | |
| 20 | | | | | |

| Batch | MG 2 FR 0 | MG 2 FR 0.05 | ... | MG 2 FR 0.75 | MG 2 FR 0.8 |
|---|---|---|---|---|---|
| 1 | 0 | 4.9 | | 39.1 | 41.2 |
| ... | | | | | |
| 20 | | | | | |

(51) Int. Cl.
*C21B 7/20* (2006.01)
*F27B 1/20* (2006.01)
*F27B 1/28* (2006.01)
*F27D 3/00* (2006.01)
*F27D 3/10* (2006.01)
*F27D 19/00* (2006.01)
*F27D 21/00* (2006.01)

(52) U.S. Cl.
CPC .............. *C21B 2300/04* (2013.01); *F27B 1/20* (2013.01); *F27B 1/28* (2013.01); *F27D 3/0025* (2013.01); *F27D 3/10* (2013.01); *F27D 19/00* (2013.01); *F27D 21/00* (2013.01); *G05B 2219/13144* (2013.01); *B60L 2200/26* (2013.01)

(56) References Cited

U.S. PATENT DOCUMENTS

| | | | | |
|---|---|---|---|---|
| 4,776,884 A | * | 10/1988 | Chen et al. | 75/469 |
| 4,913,406 A | * | 4/1990 | Fukushima et al. | 266/92 |
| 4,963,186 A | * | 10/1990 | Shimizu et al. | 75/378 |
| 4,976,780 A | * | 12/1990 | Amano et al. | 75/375 |
| 5,798,946 A | * | 8/1998 | Khesin | 700/274 |
| 6,800,113 B2 | * | 10/2004 | Contrucci et al. | 75/473 |
| 7,020,876 B1 | | 3/2006 | Deitz | |
| 7,484,955 B2 | * | 2/2009 | Flynn et al. | 431/9 |
| 7,930,059 B2 | * | 4/2011 | Sugishita et al. | 700/207 |
| 2002/0099474 A1 | * | 7/2002 | Khesin | 700/274 |
| 2004/0226406 A1 | * | 11/2004 | Duarte-Escareno et al. | 75/452 |
| 2009/0193936 A1 | * | 8/2009 | Lu et al. | 75/375 |
| 2009/0214993 A1 | * | 8/2009 | Fuller et al. | 431/13 |

OTHER PUBLICATIONS

Chinese Office Action for corresponding Chinese patent application No. 201080005829.0 filed Jan. 28, 2010.
International Preliminary Report on Patentability for corresponding application PCT/EP2012/051015 filed Jan. 28, 2010; Mail date May 11, 2011.
Written Opinion for corresponding application PCT/EP2012/051015 filed Jan. 28, 2010; Mail date Apr. 21, 2010.
Sun Changshun, "Automatic charging control system of Baoutou Steel's No. 4 BF", Ironmaking, vol. 18, No. 51, Sep. 30, 1999, pp. 58-62.

* cited by examiner

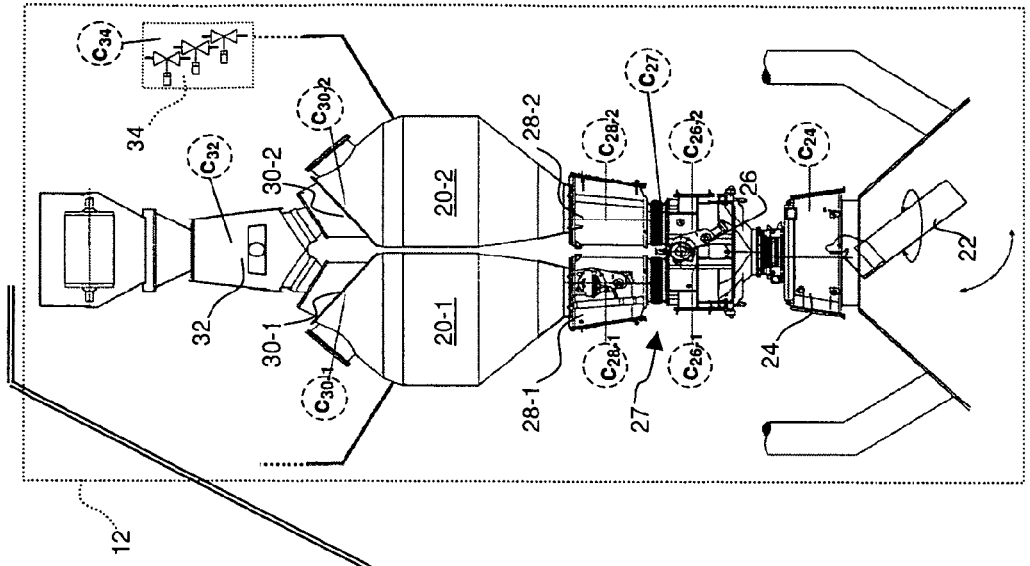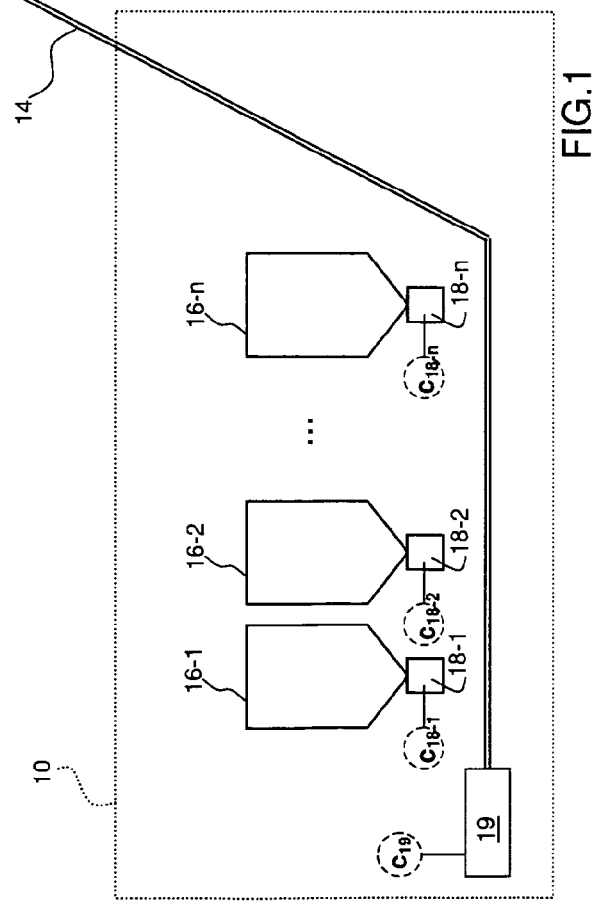
FIG.1

FIG. 5

| Charges per charging cycle | 2 |
| --- | --- |

| Batch | 1 | | 2 | | 3 | | 4 | | 5 | | 6 | | 7 |
| --- | --- | --- | --- | --- | --- | --- | --- | --- | --- | --- | --- | --- | --- |
| 1 | C1 | 105 | C2 | 105 | | | | | | | | | |
| 2 | S1 | 100 | S2 | 100 | NC1 | 100 | O1 | 200 | P1 | 50 | A5 | 100 | A1 | 100 |
| 3 | C1 | 95 | C2 | 95 | | | | | | | | | |
| 4 | S1 | 100 | S2 | 100 | NC1 | 100 | P1 | 150 | A5 | 100 | A1 | 100 | |
| 5 | | | | | | | | | | | | | |
| 6 | | | | | | | | | | | | | |

Percent for each material

FIG. 6

| | Coke | Nut Coke | Sinter | Pellets | Ore | Additive | Additive | Additive |
| --- | --- | --- | --- | --- | --- | --- | --- | --- |
| | C1 | NC | S1 | P1 | O1 | A1 | A2 | A3 |
| Dry Weight | 2 | 1 | 2 | 1 | 1 | 2 | 2 | 2 |
| Extractors [kg/tHM] | 290.0 | 40.0 | 1185.1 | 237.0 | 158.0 | 21.4 | 0.3 | 12.8 |
| [t] | 16.4 | 2.3 | 67.1 | 13.4 | 9.0 | 1.2 | 0.0 | 0.7 |

| Coke Layer Height at throat [mm] | 600 |
| --- | --- |

○ Overwrite

FIG. 7

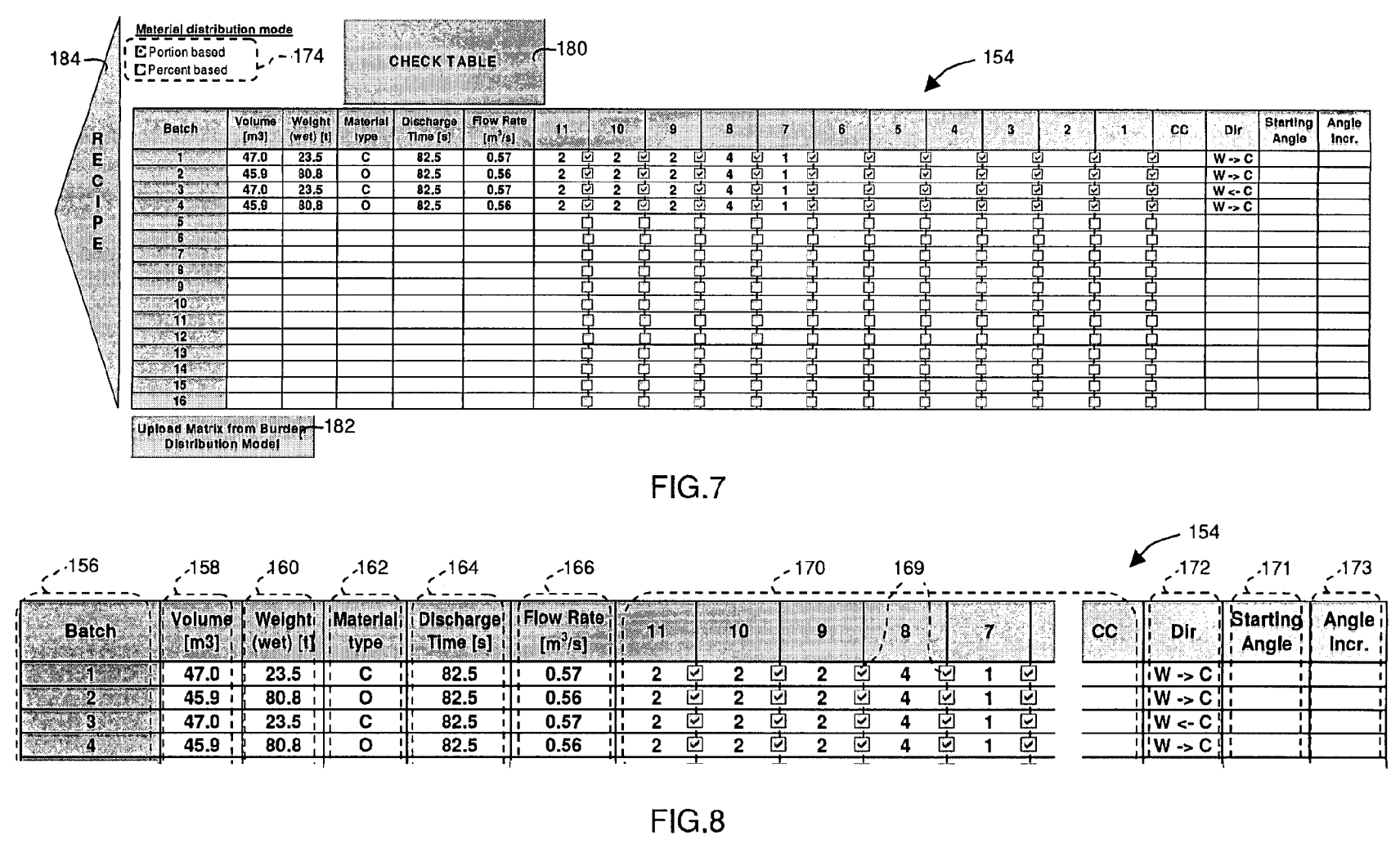

Material distribution mode: ☐ Portion based ☐ Percent based — 174

| Batch | Volume [m³] | Weight (wet) [t] | Material type | Discharge Time [s] | Flow Rate [m³/s] | 11 | 10 | 9 | 8 | 7 | 6 | 5 | 4 | 3 | 2 | 1 | CC | Dir | Starting Angle | Angle Incr. |
|---|---|---|---|---|---|---|---|---|---|---|---|---|---|---|---|---|---|---|---|---|
| 1 | 47.0 | 23.5 | C | 82.5 | 0.57 | 2 | 2 | 2 | 4 | 1 | | | | | | | | W->C | | |
| 2 | 45.9 | 80.8 | O | 82.5 | 0.56 | 2 | 2 | 2 | 4 | 1 | | | | | | | | W->C | | |
| 3 | 47.0 | 23.5 | C | 82.5 | 0.57 | 2 | 2 | 2 | 4 | 1 | | | | | | | | W<-C | | |
| 4 | 45.9 | 80.8 | O | 82.5 | 0.56 | 2 | 2 | 2 | 4 | 1 | | | | | | | | W->C | | |
| 5 | | | | | | | | | | | | | | | | | | | | |
| 6 | | | | | | | | | | | | | | | | | | | | |
| 7 | | | | | | | | | | | | | | | | | | | | |
| 8 | | | | | | | | | | | | | | | | | | | | |
| 9 | | | | | | | | | | | | | | | | | | | | |
| 10 | | | | | | | | | | | | | | | | | | | | |
| 11 | | | | | | | | | | | | | | | | | | | | |
| 12 | | | | | | | | | | | | | | | | | | | | |
| 13 | | | | | | | | | | | | | | | | | | | | |
| 14 | | | | | | | | | | | | | | | | | | | | |
| 15 | | | | | | | | | | | | | | | | | | | | |
| 16 | | | | | | | | | | | | | | | | | | | | |

CHECK TABLE — 180

Upload Matrix from Burden Distribution Model — 182

RECIPE — 184

FIG. 8

| Batch | Volume [m³] | Weight (wet) [t] | Material type | Discharge Time [s] | Flow Rate [m³/s] | 11 | 10 | 9 | 8 | 7 | CC | Dir | Starting Angle | Angle Incr. |
|---|---|---|---|---|---|---|---|---|---|---|---|---|---|---|
| 1 | 47.0 | 23.5 | C | 82.5 | 0.57 | 2 | 2 | 2 | 4 | 1 | | W->C | | |
| 2 | 45.9 | 80.8 | O | 82.5 | 0.56 | 2 | 2 | 2 | 4 | 1 | | W->C | | |
| 3 | 47.0 | 23.5 | C | 82.5 | 0.57 | 2 | 2 | 2 | 4 | 1 | | W<-C | | |
| 4 | 45.9 | 80.8 | O | 82.5 | 0.56 | 2 | 2 | 2 | 4 | 1 | | W->C | | |

| Extractor | Bin | BF | Ready | Burden Family | Material Type | Desc/ Brand | Density [kg/m³] | Humidity [%] | Max. extraction vol. per WH [m³] | Rated Extraction per WH [m³/h] | Accumulor Value [t] | Maximum Correction [t] | No Correction Threshold [t] | Max. Correction Threshold [t] | Max. Accumulor Value [t] |
|---|---|---|---|---|---|---|---|---|---|---|---|---|---|---|---|
| PU02/1-CBC-01 | PU02/1-SEC-01 | BF1 | Y | Coke | C1 | From Coke Plant | 500 | 3.5 | 45 | 800 | | 2.00 | 0.50 | 2.00 | 10 |
| PU02/1-CBC-02 | PU02/1-SEC-02 | BF1 | Y | Coke | C1 | From Coke Plant | 500 | 3.5 | 45 | 800 | | 2.00 | 0.50 | 2.00 | 10 |
| PU02-TNC-01 | SINC-01 | BF1 | Y | Nut Coke | NC | | 550 | 3.5 | NA | 100 | | 0.50 | 0.10 | 0.40 | 2 |
| PU02/1-CBS-01 | PU02/1-SES-01 | BF1 | Y | Sinter | S1 | From Sinter Plant | 1700 | 1.5 | 45 | 700 | | 2.00 | 0.50 | 2.00 | 10 |
| PU02/1-CBS-02 | PU02/1-SES-02 | BF1 | Y | Sinter | S1 | From Sinter Plant | 1700 | 1.5 | 45 | 700 | | 2.00 | 0.50 | 2.00 | 10 |
| PU02/1-CBP-01 | PU02/1-SEP-01 | BF1 | Y | Pellets | P1 | XMC | 2300 | 1 | 45 | 450 | | 2.00 | 0.50 | 2.00 | 10 |
| PU02/1-CBO-01 | PU02/1-SEO-01 | BF1 | Y | Ore | O1 | Carajas | 2700 | 1 | 45 | 400 | | 1.00 | 0.50 | 2.00 | 10 |
| PU02/1-TA-01 | SEA-01 | BF1 | Y | Additive | A1 | Serpentine | 2100 | 0 | NA | 100 | | 0.10 | 0.02 | 0.08 | 2 |
| PU02/1-TA-02 | SEA-02 | BF1 | Y | Additive | A2 | Dolomite | 2100 | 0 | NA | 100 | | 0.10 | 0.02 | 0.08 | 2 |
| PU02/1-TA-03 | SEA-03 | BF1 | Y | Additive | A3 | Quartzite | 2100 | 0 | NA | 100 | | 0.10 | 0.02 | 0.08 | 2 |
| PU02/1-TA-04 | SEA-04 | BF1 | Y | Additive | A1 | Serpentine | 2100 | 0 | NA | 100 | | 0.10 | 0.02 | 0.08 | 2 |
| PU02/1-TA-05 | SEA-05 | BF1 | Y | Additive | A2 | Dolomite | 2100 | 0 | NA | 100 | | 0.10 | 0.02 | 0.08 | 2 |
| PU02/1-TA-06 | SEA-06 | BF1 | Y | Additive | A3 | Quartzite | 2100 | 0 | NA | 100 | | 2.00 | 0.50 | 2.00 | 10 |
| PU02/2-CBC-01 | PU02/2-SEC-01 | BF2 | Y | Coke | C1 | From Coke Plant | 500 | 3.5 | 45 | 800 | | 2.00 | 0.50 | 2.00 | 10 |
| PU02/2-CBC-02 | PU02/2-SEC-02 | BF2 | Y | Coke | C1 | From Coke Plant | 500 | 3.5 | 45 | 800 | | 2.00 | 0.50 | 2.00 | 10 |
| PU02-TNC-02 | SINC-01 | BF2 | Y | Nut Coke | NC | | 550 | 3.5 | NA | 100 | | 0.50 | 0.10 | 0.40 | 2 |
| PU02/2-CBS-01 | PU02/2-SES-01 | BF2 | Y | Sinter | S1 | From Sinter Plant | 1700 | 1.5 | 45 | 700 | | 2.00 | 0.50 | 2.00 | 10 |
| PU02/2-CBS-02 | PU02/2-SES-02 | BF2 | Y | Sinter | S1 | From Sinter Plant | 1700 | 1.5 | 45 | 700 | | 2.00 | 0.50 | 2.00 | 10 |
| PU02/2-CBP-01 | PU02/2-SEP-01 | BF2 | Y | Pellets | P1 | XMC | 2300 | 1 | 45 | 450 | | 2.00 | 0.50 | 2.00 | 10 |
| PU02/2-CBO-01 | PU02/2-SEO-01 | BF2 | Y | Ore | O1 | Carajas | 2700 | 1 | 45 | 400 | | 1.00 | 0.50 | 2.00 | 10 |
| PU02/2-TA-01 | SEA-01 | BF2 | Y | Additive | A1 | Serpentine | 2100 | 0 | NA | 100 | | 0.10 | 0.02 | 0.08 | 2 |
| PU02/2-TA-02 | SEA-02 | BF2 | Y | Additive | A2 | Dolomite | 2100 | 0 | NA | 100 | | 0.10 | 0.02 | 0.08 | 2 |
| PU02/2-TA-03 | SEA-03 | BF2 | Y | Additive | A3 | Quartzite | 2100 | 0 | NA | 100 | | 0.10 | 0.02 | 0.08 | 2 |
| PU02/2-TA-04 | SEA-04 | BF2 | Y | Additive | A1 | Serpentine | 2100 | 0 | NA | 100 | | 0.10 | 0.02 | 0.08 | 2 |
| PU02/2-TA-05 | SEA-05 | BF2 | Y | Additive | A2 | Dolomite | 2100 | 0 | NA | 100 | | 0.10 | 0.02 | 0.08 | 2 |
| PU02/2-TA-06 | SEA-06 | BF2 | Y | Additive | A3 | Quartzite | 2100 | 0 | NA | 100 | | 0.10 | 0.02 | 0.08 | 2 |

| Extractor | Analysis code | Fe tot | CaO | SiO2 | Al2O3 | MgO | K2O | Na2O | S | Zn | Si | Ashes |
|---|---|---|---|---|---|---|---|---|---|---|---|---|
| PU02/1-CBC-01 | | 5.90 | 2.84 | 52.85 | 28.08 | 0.72 | 1.10 | 1.43 | 0.40 | | | 9.00 |
| PU02/1-CBC-02 | | 5.90 | 2.84 | 52.85 | 28.08 | 0.72 | 1.10 | 1.43 | 0.40 | | | 9.00 |
| PU02-TNC-01 | | 6.00 | 2.84 | 52.85 | 28.08 | 0.72 | 1.10 | 1.43 | 0.40 | | | 9.00 |
| PU02/1-CBS-01 | | 59.00 | 9.25 | 5.52 | 1.13 | 1.13 | 0.04 | | 0.01 | | | |
| PU02/1-CBS-02 | | 58.00 | 9.25 | 5.52 | 1.13 | 1.13 | 0.04 | | 0.01 | 0.02 | | |
| PU02/1-CBP-01 | 142638456 | 65.70 | 2.65 | 2.40 | 0.65 | 0.05 | | | 0.01 | 0.02 | | |
| PU02/1-CBO-01 | | 65.00 | 0.03 | 2.50 | 2.00 | 0.03 | 0.01 | 0.01 | 0.01 | | | |
| PU02/1-TA-01 | | | 0.69 | 38.70 | | 43.60 | | | | | | |
| PU02/1-TA-02 | | | 56.50 | 0.76 | 0.38 | 1.02 | | | | | | |
| PU02/1-TA-03 | | 0.63 | 0.01 | 97.70 | 0.29 | 0.02 | 0.03 | | | | | |
| PU02/1-TA-04 | | | 0.69 | 38.70 | | 43.60 | | | | | | |
| PU02/1-TA-05 | | | 56.50 | 0.76 | 0.38 | 1.02 | | | | | | |
| PU02/1-TA-06 | | 0.63 | 0.01 | 97.70 | 0.29 | 0.02 | 0.03 | 0.01 | | | | |
| PU02/2-CBC-01 | | 5.90 | 2.84 | 52.85 | 28.08 | 0.72 | 1.10 | 1.43 | 0.40 | | | 9.00 |
| PU02/2-CBC-02 | | 5.90 | 2.84 | 52.85 | 28.08 | 0.72 | 1.10 | 1.43 | 0.40 | | | 9.00 |
| PU02-TNC-02 | | 6.00 | 2.84 | 52.85 | 28.08 | 0.72 | 1.10 | 1.43 | 0.40 | | | 9.00 |
| PU02/2-CBS-01 | | 59.00 | 9.25 | 5.52 | 1.13 | 1.13 | 0.04 | | 0.01 | | | |
| PU02/2-CBS-02 | | 58.00 | 9.25 | 5.52 | 1.13 | 1.13 | 0.04 | | 0.01 | 0.02 | | |
| PU02/2-CBP-01 | 142638456 | 65.70 | 2.65 | 2.40 | 0.65 | 0.05 | | | 0.01 | 0.02 | | |
| PU02/2-CBO-01 | | 65.00 | 0.03 | 2.50 | 2.00 | 0.03 | 0.01 | 0.01 | 0.01 | | | |
| PU02/2-TA-01 | | | 0.69 | 38.70 | | 43.60 | | | | | | |
| PU02/2-TA-02 | | | 56.50 | 0.76 | 0.38 | 1.02 | | | | | | |
| PU02/2-TA-03 | | 0.63 | 0.01 | 97.70 | 0.29 | 0.02 | 0.03 | | | | | |
| PU02/2-TA-04 | | | 0.69 | 38.70 | | 43.60 | | | | | | |
| PU02/2-TA-05 | | | 56.50 | 0.76 | 0.38 | 1.02 | | | | | | |
| PU02/2-TA-06 | | 0.63 | 0.01 | 97.70 | 0.29 | 0.02 | 0.03 | 0.01 | | | | |

FIG. 13

| Extractors | Burden Family | Material Type | Extractor | Bin | Brand/Description | Density [kg/m³] | Humidity [%] | Max. extraction vol. per WH [m³] | Rated Extraction per WH [m³/h] | Fe tot | CaO | SiO2 | Al2O3 | MgO | K2O | Na2O | S | Zn | Si | Ashes |
|---|---|---|---|---|---|---|---|---|---|---|---|---|---|---|---|---|---|---|---|---|
| 2 | Coke | C1 | PU02/1-CBC-01, PU02/1-CBC-02 | PU02/1-SEC-01, PU02/1-SEC-02 | From Coke P | 500 | 3.5 | 45 | 800 | 5.90 | 2.84 | 52.85 | 28.08 | 0.72 | 1.10 | 1.43 | 0.40 | 0.00 | 0.00 | 9.00 |
| 1 | Nut Coke | NC | PU02-TNC-01 | SINC-01 | | 550 | 3.5 | 10000 | 100 | 6.00 | 2.84 | 52.85 | 28.08 | 0.72 | 1.10 | 1.43 | 0.40 | 0.00 | 0.00 | 9.00 |
| 2 | Sinter | S1 | PU02/1-CBS-01, PU02/1-CBS-02 | PU02/1-SES-01, PU02/1-SES-02 | From Sinter F | 1700 | 1.5 | 45 | 700 | 58.50 | 9.25 | 5.52 | 1.13 | 1.13 | 0.04 | 0.00 | 0.01 | 0.02 | 0.00 | 0.00 |
| 1 | Pellets | P1 | PU02/1-CBP-01 | PU02/1-SEP-01 | XMC | 2300 | 1 | 45 | 450 | 65.70 | 2.65 | 2.40 | 0.65 | 0.05 | 0.00 | 0.00 | 0.01 | 0.00 | 0.00 | 0.00 |
| 1 | Ore | O1 | PU02/1-CBO-01 | PU02/1-SEO-01 | Carajas | 2700 | 1 | 45 | 400 | 65.00 | 0.03 | 2.50 | 2.00 | 0.03 | 0.01 | 0.01 | 0.01 | 0.00 | 0.00 | 0.00 |
| 2 | Additive | A1 | PU02/1-TA-01, PU02/1-TA-04 | SEA-01, SEA-04 | Serpentine | 2100 | 0 | 10000 | 100 | 0.00 | 0.69 | 38.70 | 0.00 | 43.60 | 0.00 | 0.00 | 0.00 | 0.00 | 0.00 | 0.00 |
| 2 | Additive | A2 | PU02/1-TA-02, PU02/1-TA-05 | SEA-02, SEA-05 | Dolomite | 2100 | 0 | 10000 | 100 | 0.00 | 56.50 | 0.76 | 0.38 | 1.02 | 0.00 | 0.00 | 0.00 | 0.00 | 0.00 | 0.00 |
| 2 | Additive | A3 | PU02/1-TA-03, PU02/1-TA-06 | SEA-03, SEA-06 | Quartzite | 2100 | 0 | 10000 | 100 | 0.63 | 0.01 | 97.70 | 0.29 | 0.02 | 0.03 | 0.01 | 0.00 | 0.00 | 0.00 | 0.00 |

| Batch | Type | Average density | Expect. Weight | Wall Centre | Discharge time | Start Angle | Angle incr. |
|---|---|---|---|---|---|---|---|
| 1 | O | 2000 | 15500 | W | 120 | 90 | +20 |
| ... | | | | | | | |
| 20 | | | | | | | |

| Batch | t11 | t10 | ... | t1 | tCC | w11 | w10 | ... | w1 | wCC |
|---|---|---|---|---|---|---|---|---|---|---|
| 1 | 2 | 3 | | 1 | | 2 | 3 | | 1 | |
| ... | | | | | | | | | | |
| 20 | | | | | | | | | | |

| Batch | MG 11_10 | MG_10_09 | ... | MG_02_01 | MG_01_CC |
|---|---|---|---|---|---|
| 1 | N | N | | Y | Y |
| ... | | | | | |
| 20 | | | | | |

| Batch | MG 1 FR 0 | MG 1 FR 0.05 | ... | MG 1 FR 0.75 | MG 1 FR 0.8 |
|---|---|---|---|---|---|
| 1 | 0 | 5.0 | | 40.1 | 41.0 |
| ... | | | | | |
| 20 | | | | | |

| Batch | MG 2 FR 0 | MG 2 FR 0.05 | ... | MG 2 FR 0.75 | MG 2 FR 0.8 |
|---|---|---|---|---|---|
| 1 | 0 | 4.9 | | 39.1 | 41.2 |
| ... | | | | | |
| 20 | | | | | |

COMPUTER SYSTEM AND METHOD FOR CONTROLLING CHARGING OF A BLAST FURNACE BY MEANS OF A USER INTERFACE

TECHNICAL FIELD

The present invention generally relates to charging of a blast furnace. More specifically, the invention relates to computer-assisted control of the charging procedure of a blast furnace that is equipped with an automated top-charging installation for charging batches of material into the blast furnace and with an automated material feeding installation for feeding charge material in batched manner to the top-charging installation.

BACKGROUND

Control of the charging procedure is a crucial aspect of blast furnace operation. Appropriate charging is required for best possible furnace performance, e.g. as regards gas flow and chemical reactions inside the furnace. Typical charging requirements include among others: charging the correct weight of each raw material, keeping the proper order of raw materials and achieving the desired stock-line profile. A related crucial aspect is proper burdening, i.e. determining the required weight of each raw material, in order to ensure proper burden composition for a desired chemistry of hot metal and slag.

In modern plants, the blast furnace is fed with raw materials by means of an automated material feeding installation comprising a stockhouse with automatic weighing equipment and an associated automatic conveyor. In the stockhouse, batches of one or more raw materials (ore, pellets, sinter, coke, flux, etc.) are weighed and transferred to the automated conveyor, e.g. a conveyor belt or skip car arrangement. The conveyor transports the batches to the furnace top, where they are received in a hopper of a top-charging installation. Modern blast furnaces also usually comprise an automated top-charging installation, for example according to the widespread BELL LESS TOP™ principle, which typically includes a rotatable and pivotable chute to allow precise distribution of material on the stock-line according to a desired profile.

Such automated feeding and top-charging installations are controlled by dedicated or common process control(s), which in turn is/are typically operated by means of a computer system serving as human-machine-interface (HMI).

In known systems for computer-assisted control of the blast furnace charging procedure, the operator can program a charging cycle by defining a sequence of batches to be fed from the stockhouse and charged into the furnace. The batches are defined by setting the type and quantity, usually dry weight, of the raw materials to be contained in each batch in the HMI in accordance with a previous manual or computerized burdening calculation. A known system also allows configuring the settings of the top charging installation for each batch via the HMI.

BRIEF SUMMARY

The invention provides a user interface of improved user convenience for controlling charging of a blast furnace, in particular a blast furnace that is equipped with an automated top-charging installation for charging batches of material into the furnace and with an automated material feeding installation for feeding charge material in batches to the top-charging installation.

In the present context, the user interface is to be understood as the aggregate of means of input and output, in particular computer program means, by which the operator interacts with the process control system.

The present invention proposes a computer-implemented method and a computer system for controlling charging of a blast furnace. In known manner, the furnace is typically equipped with an automated top-charging installation for charging batches of material into the blast furnace and with an automated material feeding installation for feeding charge material in batches to the top-charging installation. In order to achieve the first object, the proposed method comprises the preliminary steps of:

obtaining a nominal charge dataset reflecting a nominal blast furnace charge which complies with a predetermined burden composition, the nominal charge dataset comprising plural charge material records, each charge material record comprising a material type and an associated nominal charge quantity;

generating a graphical user interface on a display, the graphical user interface comprising batch data fields for entering and displaying plural batch datasets for pre-configuring batches of raw material to be fed to the top-charging installation by the material feeding installation, each batch dataset comprising at least one batching record, each batching record comprising a material type and an associated batching proportion; and obtaining one or more batch datasets.

The datasets, i.e. collections of related data, are obtained either by manual user entry, by computation or from an external data source such as directly from a stored file or indirectly from a external software module operating on stored or entered data. The above steps need not necessarily performed in the indicated order, e.g. the graphical user interface may be generated before the datasets are obtained.

According an important aspect for achieving the first object of the invention as claimed, the batching proportion respectively associated to a material type in a batching record is used for predefining a ratio between the material quantity that is to be contained in a batch and the nominal charge quantity of the associated material type according to a nominal charge reflected by the nominal charge dataset.

According another important aspect for achieving the first object, the method comprises computing, for the respective material type of each batching record in an obtained batch dataset and based on the batching proportion and the nominal charge quantity associated to the respective material type, an associated batching quantity which the material feeding installation is to provide in a batch of raw material pre-configured by the obtained batch dataset.

The proposed computer system comprises means adapted for performing the above method, in particular accordingly programmed computing means of suitable type, such as a workstation computer, a server, a programmable logic controller or any other suitable data processing device or a combination thereof forming a system.

As will be appreciated, the proposed method and system provide a more user-friendly and time-saving approach to the definition of the parameters required for controlling the charging procedure. This is in particular because batches to be charged are defined in relative terms only and thus, in many cases, need not be modified in case of frequently occurring changes of the nominal charge due to recalculated burden composition. Moreover, the proposed approach eliminates the risk of user input errors since the required extent of user input is minimized.

The invention also proposes a data carrier having thereon a computer program comprising computer implementable instructions for causing a computer system to perform the claimed method.

BRIEF DESCRIPTION OF THE DRAWINGS

Further details and advantages of the present invention will be apparent from the following non-limiting detailed description with reference to the attached drawings, wherein:

FIG. 1 is a schematic view of an automated material feeding installation and an automated top-charging installation in a blast furnace plant;

FIGS. 4-6 are screenshots illustrating a GUI view (batch configuration view) in definition mode of the user interface;

FIGS. 7-8 are screenshots illustrating a second GUI view (top-charging configuration view) in recipe definition mode of the user interface;

FIGS. 11-12 are screenshots showing GUI views of an extractor table used by the user interface;

FIG. 13 is a screenshot showing a GUI view of a material table (by material types) derived from the table of FIGS. 12-13;

DETAILED DESCRIPTION

Exemplary Material Feeding and Top-Charging Installations

Figure 2:
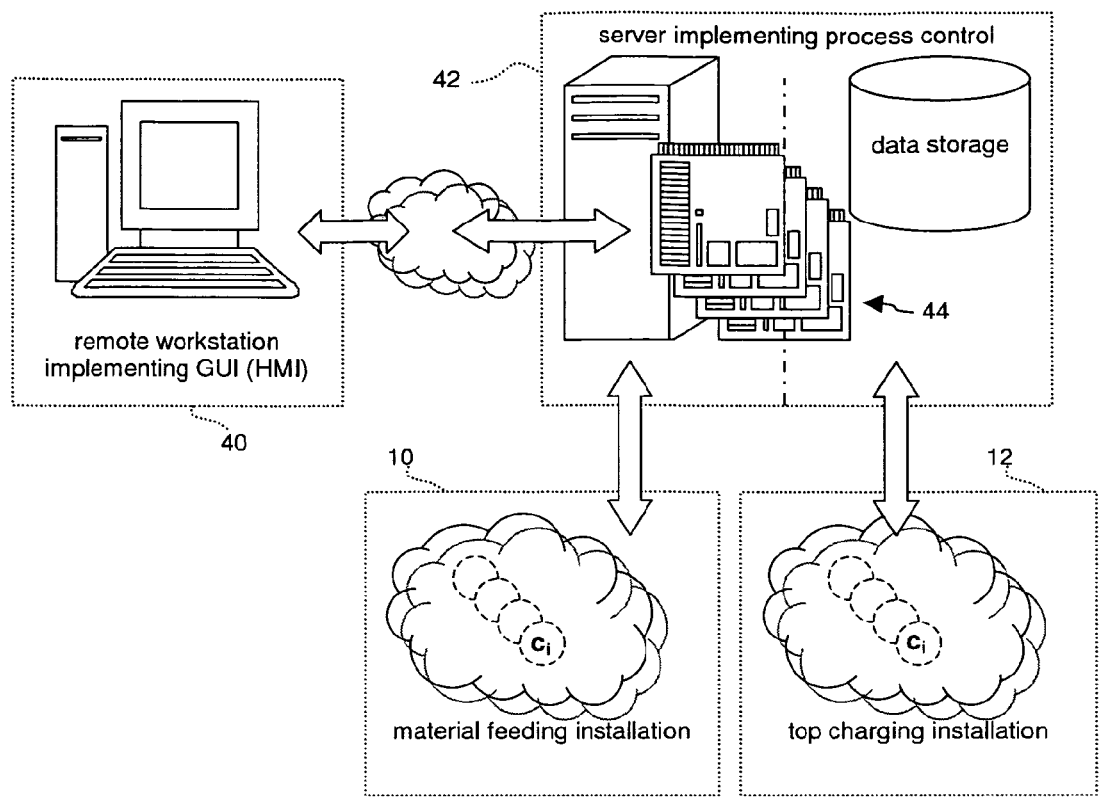
FIG. 2 is a diagrammatic view of a first hardware architecture for process control of installations as illustrated in FIG. 1 by means of a user interface according to the invention.

FIG. 1 schematically illustrates an exemplary automated material feeding installation, generally identified by reference numeral 10, and an exemplary automated top-charging installation, generally identified by reference numeral 12, arranged on the throat of a blast furnace.

The material feeding installation 10 comprises a conveyor, generally identified by reference numeral 14, such as a skip car and skip bridge system or, preferably, a belt conveyor system, and multiple weighing hoppers 16-1, 16-2 . . . 16-$n$ from which material is delivered to the conveyor 14. In known manner, the weighing hoppers 16-1, 16-2 . . . 16-$n$ are each equipped with a weight measurement system (not shown). They are typically fed with material from large capacity storage bins e.g. via an arrangement (not shown) comprising a bin extractor, a sieve for removal of fines and a conveyor system leading to the weighing hoppers 16-1, 16-2 . . . 16-$n$. In case of a belt conveyor system, the conveyor 14 typically comprises several auxiliary feed conveyor belts associated to subsets of one or more weighing hoppers 16-1, 16-2 . . . 16-$n$ and discharging onto a main conveyor belt that leads to the top-charging installation 12. The weighing hoppers 16-1 . . . 16-$n$ are part of a stockhouse or high-line complex of typical configuration, which supplies each of the weighing hoppers 16-1 . . . 16-$n$ with a given type of bulk raw material from a storage site. Each weighing hopper 16-1, 16-2 . . . 16-$n$ is equipped with an associated gate valve or extractor 18-1, 18-2 . . . 18-$n$ for batching i.e. delivering a dosed quantity of respective raw material to the conveyor 14. The conveyor 14 is configured to transport batches of raw material to the furnace top, more specifically to the top-charging installation 12 and equipped with a corresponding conveyor drive 19 (e.g. belt conveyor drive arrangement in case or skip system winch house).

As shown in FIG. 1, the exemplary top-charging installation 12 comprises two parallel receiving hoppers 20-1, 20-2 for receiving material supplied by the conveyor 14 and a distribution chute 22 that is rotatable about the furnace axis and pivotable bout a horizontal axis by means of an associated chute drive unit 24 in order to allow distribution of charge material on the stock-line surface. The top-charging installation 12 comprises a lower sealing valve arrangement 26 providing a lower sealing valve for each receiving hopper 20-1, 20-2, a weighing system 27 with suitable scales such as weighing beams (not shown) for weighing each hopper 20-1, 20-2 to monitor their filling and discharging thereof and a respective material gate valve 28-1, 28-2 at the outlet of each receiving hopper 20-1, 20-2 to provided discharge metering. The top part of each hopper 20-1, 20-2 is equipped with an upper sealing valve 30-1, 30-2 and communicates with a distribution rocker 32 which redirects material received from the conveyer 14 selectively into either of the hoppers 20-1, 20-2. Each hopper 20-1, 20-2 is connected to pressure equalization system 34 equipped with automatic valves, e.g. hydraulically operated valves (schematically shown) cooperating with the respective upper and lower sealing valves to provide the gas lock function of the hoppers 20-1, 20-2. In operation, the material feeding installation 10 is used to feed raw material in batches adapted to the capacity of the hoppers 20-1, 20-2. The top-charging installation 12 in turn serves to charge the batches of bulk raw material into the furnace in controlled manner. A charging installation 12 with rotatable and pivotable distribution chute 22 has the benefit of allowing precise distribution of the material over the stock-line surface.

As further illustrated in FIG. 1, certain components of both the material feeding installation 10 and of the top-charging installation 12, more precisely those components that include actuators and/or sensors for purpose of automation, are connected with their actuators and/or sensors to respective control devices of suitable known configuration (e.g. programmable logic controllers: PLC) for automation purposes. The control devices are schematically indicated in FIG. 1 by dashed circles with an associated reference sign $c_i$ (with a subscript index i corresponding to the reference numeral of the controlled component). The control devices $c_i$ are connected to the respective actuator(s) and/or sensor(s) using an appropriate industrial bus system (e.g. according to the fieldbus standard) and can be provided in the from of a dedicated device for each component or grouped into appropriate functional units, e.g. with a single PLC implementing the controllers $c_{18-1} \ldots c_{18-n}$ for controlling the extractors, or a single PLC implementing the controllers $c_{26}, c_{30-1}, c_{30-2}$ of the sealing valves.

Exemplary System Architectures for Automation

FIG. 2 illustrates a possible hardware architecture for process control of a material feeding installation 10 and a top-charging installation 12 as exemplified in FIG. 1. In FIG. 2 a remote workstation 40 runs software providing a human-machine-interface (HMI) by means of which an operator can monitor or operate the installations 10, 12. The workstation 40 comprises typical input/output devices, such as screen, keyboard and mouse, allowing user interaction with the interface which will be detailed below. A central server 42 runs software, e.g. OLE for Process Control (OPC) server software, providing communication with the control devices $c_i$ of the material feeding installation 10 and the top-charging installation 12 respectively through appropriate hardware interfaces 44. The server 42 communicates with the remote work station 40 via a network (e.g. Ethernet/LAN). In the embodiment of FIG. 2, data storage and interfacing with the control devices $c_i$ is provided by server 42 in accordance with user interaction with the interface running on remote workstation 40. The embodiment of FIG. 2 thereby enables use of a user interface on different workstations.

Figure 3:
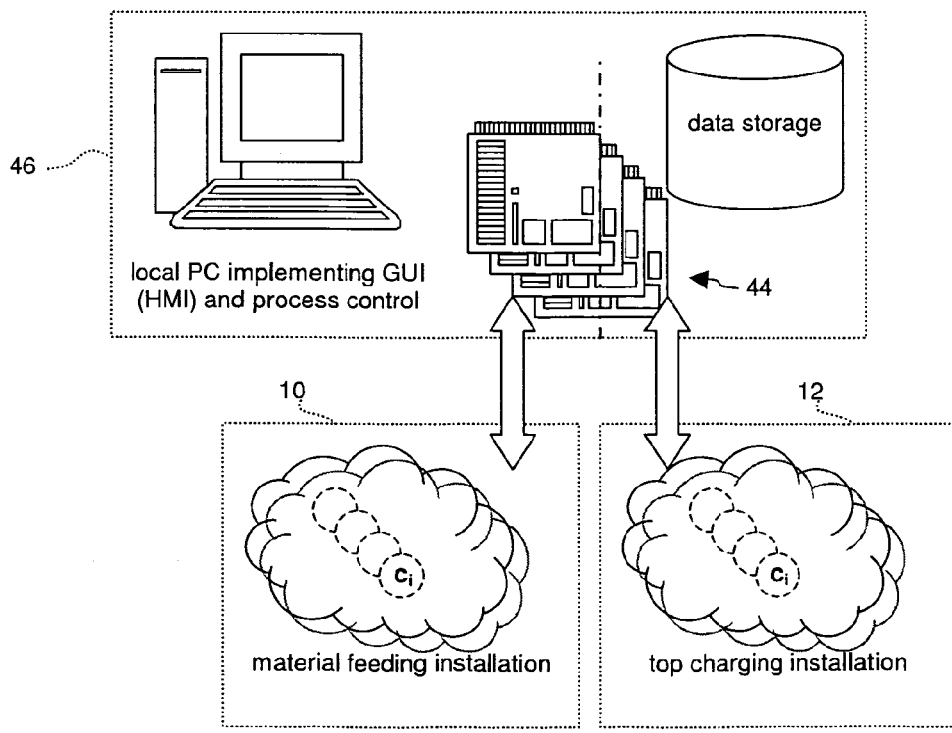
FIG. 3 is a diagrammatic view of a second hardware architecture for process control of installations as illustrated in FIG. 1 by means of the user interface.

FIG. 3 shows another exemplary hardware architecture for process control of installations 10 and 12 as exemplified in FIG. 1, in which an on-site standard PC-type computer 46 equipped with typical input/output devices implements both the user interface as well as suitable interfacing software such as an OPC server to communicate with the control devices $c_i$ by means of appropriate communication hardware.

As will be understood, the combined hierarchy of Human Machine Interface (HMI) at the top layer, the control devices $c_i$ at the middle layer and, at the bottom layer, sensors and actuators of the various installation components (as exemplified in FIG. 1) provides automation of the material feeding installation 10 and the top-charging installation 12 respectively.

User Interface

The following description will detail the configuration of a preferred user interface for controlling the charging of a blast furnace equipped with an automated material feeding installation and an automated top-charging installation as exemplified hereinbefore.

Definitions

The expressions section, batch, charge, nominal charge, charging cycle, reference basis and recipe are used hereinafter with the following meaning:

SECTION: a section is a continuous amount of material discharged by a single extractor (18-1, 18-2 ... 18-$n$ in FIG. 1). In case of a belt-type conveyor (14 in FIG. 1) sections can be queued or overlapped on the belt (see FIG. 16);

BATCH: a batch is an aggregation of materials intended to be fed into one receiving hopper (20-1, 20-2 in FIG. 1) of the top-charging installation (12 in FIG. 1) and can comprise one or more sections;

(ACTUAL) CHARGE: a charge is a set of batches, including at least one coke-containing batch and one ferrous material-containing batch, which are to be actually charged in sequence into the furnace;

NOMINAL CHARGE: a nominal charge is a theoretical charge that complies with the target burden composition aiming at a desired hot metal chemistry;

CHARGING CYCLE: a charging cycle is a sequence of (actual) charges, in which successive charges normally have a different configuration, more specifically, a charging cycle is the shortest sequence of (actual) charges to recur periodically in the charging process such that the composition of raw materials of the sequence of charges complies with the desired burden composition;

REFERENCE BASIS: expresses a desired reference quantity (by volume or by weight) of a certain material, for example a coke basis, a coke layer height (at throat or at belly) or a ferrous basis or a hot metal basis, relative to which the quantities of material required to constitute a charge are calculated;

RECIPE: a recipe is a compilation of information for controlling blast furnace charging, which contains at least: information necessary for pre-configuring each batch (to be provided by the material feeding installation 10) and information defining how the batches are to be charged into the furnace (by the top-charging installation 12).

User Interface for Controlling the Charging Procedure

The proposed user interface is based on the concept of using a so-called "recipe" containing relevant information required for controlling the process of blast furnace charging, in particular for controlling automated operation of the material feeding installation 10 and the top-charging installation 12. A preferred embodiment of a recipe contains, in general terms, at least the following information:

data determining the reference basis;
data determining the number of charges per charging cycle;
data determining the total number of batches;
data pre-configuring the batches, i.e. information on raw material types to be contained in each batch, their respective proportions relative to a nominal charge and, preferably, their respective physical arrangement on/in the conveyer (ref. 14 in FIG. 1), in particular on a main conveyor belt or in a skip car;
data determining the top-charging pattern of a batch of raw material i.e. the manner how the top-charging installation operates to discharge each batch into the blast furnace, e.g. operation of the chute drive unit (ref. 24 in FIG. 1), of the material gate valves (ref. 28-1, 28-2 in FIG. 1) and of associated equipment.

For each recipe, the above data is included in a data structure, hereinafter referred to as the "recipe file". As will be understood, the expression "file" in the present context refers to any kind of collection of related data treated as a unit, irrespective of permanent or temporary storage thereof.

Additionally, in a more advanced embodiment, the recipe file may contain data relative to the burdening calculation, in particular:

data determining the percentage of ferrous burden (e.g. in the form of iron ore, pellets or sinter);
data determining the use of additives (e.g. for slag chemistry);
data determining slag properties (e.g. slag basicity and MgO target)

Inclusion of the latter additional information in the recipe file enables automatic computer burdening calculation without the need for further user input.

A graphical user interface (GUI) is part of the proposed user interface and includes two general view modes, a definition view mode that allows definition of a recipe by the operator/user and an operation view mode that allows monitoring automated operation in accordance with a pre-defined recipe and preferably enables operator intervention. Although a WIMP-type (WIMP: window, icon, menu, pointing device) GUI is considered preferred for its ease-of-use, the user interface as a whole may include any suitable alternative GUI type such as a touch interface or textual user interface that provides for user input and display of data by means of a screen display.

Figure 4:
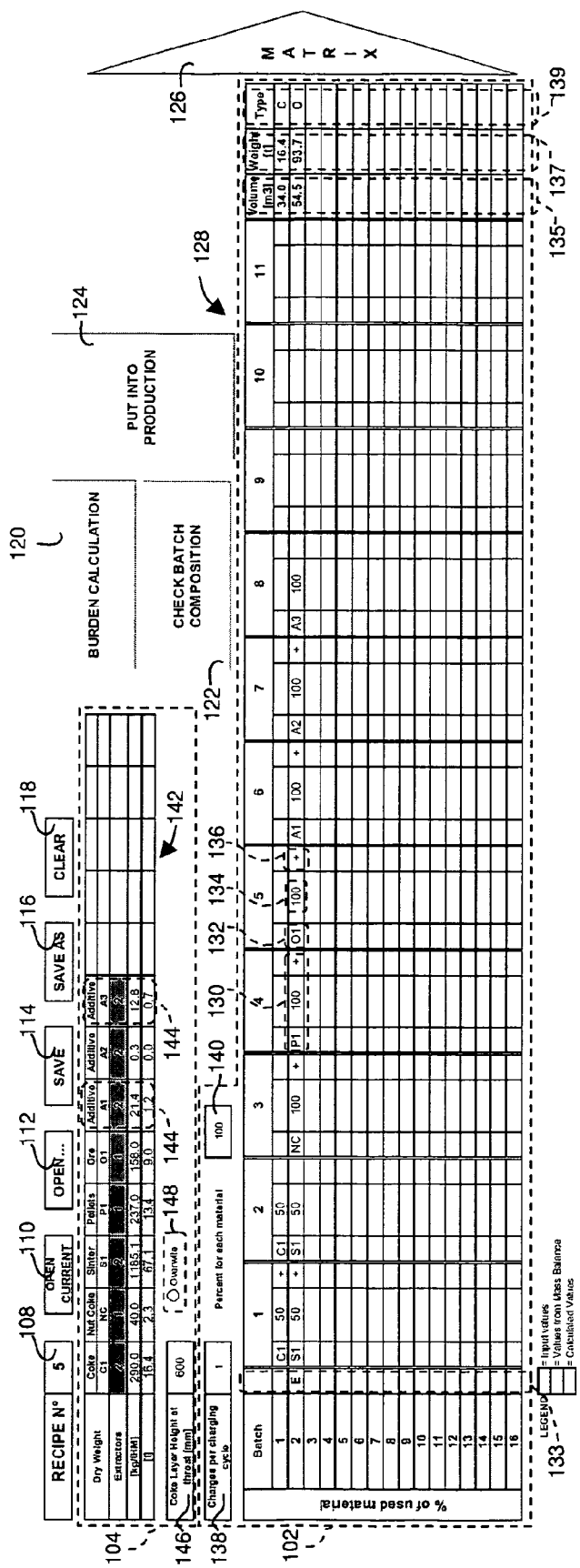

FIG. 4 and FIG. 7 show screenshots of a first view and a second view of the definition view mode respectively. Depending on the available size and number of screens, the first and second views may be displayed simultaneously or in alteration by the workstation 40 or PC-type computer 46.

Batch Configuration View

The view illustrated in FIG. 4 is designed for pre-configuring batches of raw material, which are to be produced by the material feeding installation 10 in order to be fed to the top-charging installation 12.

As shown in FIG. 4, the first GUI view of the recipe definition view mode comprises a number of functionally grouped visual regions:

a first visual region 102 including batch data fields for entering and displaying plural batch datasets pre-configuring batches of raw material to be provided by the material feeding installation 10;

a second visual region 104 including data fields for displaying a nominal charge dataset which reflects a nominal charge and burden composition data fields for entering and displaying a composition dataset aiming at a desired chemistry of hot metal to be produced by the blast furnace.

A non-editable text box 108 with label "RECIPE N°" displays an unequivocal identifier (e.g. an integer number) of the recipe which is currently in memory and displayed by the GUI. As further seen in FIG. 4, when in recipe definition view mode, the first GUI view comprises the following user operable command buttons:

"OPEN CURRENT" button 110 for opening and displaying the recipe that is currently in operation;

"OPEN . . . " button 112 for opening a saved recipe by loading a recipe file;

"SAVE" button 114 for saving data currently in memory and displayed by the GUI (if validated) in a recipe file with the same recipe identifier (currently displayed in text box 108);

"SAVE AS" button 116 for saving data currently in memory and displayed by the GUI (if validated) in a recipe file with a new unequivocal recipe identifier; (if the identifier is user-specifiable, a warning is issued if the identifier is already in use);

"CLEAR" button 118 for clearing all data fields and initializing the recipe in memory with empty or default data.

Preferably, a recipe can only be saved using button 114 or button 116 if certain basic checks called prior to saving the data complete successfully i.e. without error message, the basic checks including for instance the subroutines: "check percentage request for each material type", "check volume for weighing hopper", "check volume for receiving hopper" and "check overfilling of conveyor" which are detailed below.

The first GUI view of FIG. 4 further comprises the user operable command buttons:

"BURDEN CALCULATION" button 120 for switching to a burden composition view (if provided as an optional program module) or for manually updating/loading data into the burden composition data fields in visual region 104 e.g. from an appropriate external database or external computer burdening calculation tool;

"CHECK TABLE" button 122 for calling a "batch configuration check" subroutine (see below) used for checking and validating correctness of the batch pre-configuration according to data currently in memory as displayed in the data fields of visual region 102;

"PUT INTO PRODUCTION" button 124 for calling a "put into production" subroutine (see below) used for updating a suitable data structure ("actual matrix") based on which the process control is to control the operation of the material feeding installation 10 and the top-charging installation 12 (see description of FIG. 14);

"MATRIX" button 126 for switching to/activating a second GUI view of the recipe definition view mode for configuring top-charging parameters as illustrated in FIG. 7 and described further below (see TOP-CHARGING CONFIGURATION VIEW).

Further features and functionality related to the visual regions 102, 104 in the a first GUI view of the recipe definition view mode will be detailed below with respect to FIG. 5 and FIG. 6.

FIG. 5 shows an enlarged view of the GUI elements (graphical components with which the user interacts) in the first visual region 102 of FIG. 4 which serve to pre-configure batches. The user interface employs two basic data structures (i.e. formats for organizing data: "types") for pre-configuring batches, namely the batching record and the batch dataset.

Batching Record

A suitable batching record is e.g. a data structure of the "record" datatype, more specifically an unordered aggregate of several data items (also called members/fields) of different datatype having one value for each component item. A batching record reflects a section of material to be batched i.e. dosed by a single extractor 18-1, 18-2 . . . 18-n into a batch and contains data based on which the process control controls operation of the extractors 18-1, 18-2 . . . 18-n to create batches. In simplest form, a batching record comprises two items: a "material type" and a "batching proportion" associated to the "material type". A preferred exemplary batching record has the following structure:

| Item label (field identifier) | material type | batching proportion | batching arrangement indicator |
|---|---|---|---|
| Datatype | Alphanumeric or Enumerated (e.g. "string" or "enum") | Numeric (e.g. "integer"; "rational" or "(fixed-point) real") | Alphanumeric (e.g. "char") |

Batching Record Item: Material Type

In a batching record, the value of the material type item defines the type (i.e. kind or sort) of material to be contained in a batch. Each material type normally reflects a different raw material, i.e. material of different chemical composition. The possible values of the material type item are normally limited to one or more types (species) depending on the material family (genus) to which the type belongs, such as coke, sinter, pellets, ore, additive (e.g. fluxes), scrap metal, DRI, pig iron. Available material type values may be for instance as follows:

Coke: C1, C2, C3, . . . C9

Nut Coke: N1, N2, . . . N9

Sinter. S1, S2, . . . S9

Pellets: P1, P2, . . . P9

Ore: O1, O2, . . . O9

Additive: A1, A2, . . . A9

Pig Iron: I1, I2, . . . I9

Scrap: X1, X2, . . . X9

Direct reduced iron (DRI): D1, D2, . . . D9

Batching Record Item: Batching Proportion

The value of the batching proportion item in a given batching record predefines a ratio between:

a. the quantity of the associated material type that is to be contained in a batch (the associated material type being the material type defined in the given batching record), and b. the quantity of the associated material type that is to be contained in a nominal charge (which need not necessarily be defined upon loading, entering or editing the batching records).

As will be appreciated, batch configuration and thereby charging cycle configuration is rendered independent of the actual quantitative composition of the nominal charge by virtue of the comparative i.e. non-absolute nature of the batching proportion item. In the embodiment illustrated in FIGS. 4-6 the batching proportion values express a percentage of the corresponding nominal charge quantity although use of any other suitable dimensionless formats for expressing a quantitative ratio such as rational numbers, (improper) fractions or colon-separated integers is equivalent. To give an example, with the batching proportion defined according to data field 134 in FIG. 5, 200% of the nominal charge quantity of material type "O1" (ore) are to be dosed into a batch, whereas only 50% of the nominal charge quantity of material type "P1" (pellets) are to be dosed into this batch (see row 2, column 5 of tabular form 128 in FIG. 5). Even though irrelevant for the dimensionless value of the batching proportion per se, material type quantities used with the user interface are preferably expressing weight (dry/wet) e.g. in kilograms [kg] or metric tones [t], while quantities in terms of volume e.g. in cubic meters [m³] are not excluded.

Batching Record Item: Batching Arrangement Indicator

The value of the optional batching arrangement indicator item in a given batching record can be used for pre-configuring the manner in which the material feeding installation 10 is to provide the section of material corresponding to the batching record within a batch. More specifically, the batching arrangement indicator allows pre-configuring the arrangement of material sections in/on the conveyer 14, e.g. on a conveyor belt or in a skip. In a simple form adapted for a belt-type conveyor 14, the batching arrangement indicator allows distinguishing two basic manners of batching material onto the conveyor 14: joint discharge from several of the extractors 18-1, 18-2 . . . 18-n in conjunction to create overlapping sections on the belt or, in contrast, successive discharge from one extractor at a time 18-1, 18-2 . . . 18-n to create individually queued sections on the belt. Accordingly, exemplary values of the batching arrangement indicator for a given batching record may be:

"+" (plus sign character) indicating that the section pre-configured by the given batching record and a section pre-configured by a subsequent batching record are to be overlapping;

" " (no character) indicating that discharging of the section pre-configured by the given batching record is to start before discharging of a section pre-configured by a subsequent batching record (while it may be in overlap with a section pre-configured by one or more preceding batching record(s) with a batching arrangement indicator of value "+").

Instead of expressing a relation with respect to a subsequent batching record (using inherent order of the batch dataset structure, see below), the batching arrangement indicator may alternatively refer to a previous batching record instead. The batching arrangement indicator may also be used for batch splitting into skips in case of a skip-car conveyor instead of layering sections of material on the main conveyor belt of the conveyor 14. As will be appreciated, the manner in which raw material is arranged on the conveyor 14 determines the arrangement of material in the receiving hoppers 20-1, 20-2 and thus the composition of the material flow discharged into the furnace by the top-charging installation 12. Besides adapting the production of batches to conveyor requirements such as skip/belt capacity, the batching arrangement indicator thus allows shaping the arrangement of materials on the blast furnace stock-line. In case the stockhouse control system does not provide corresponding functionality, use of the optional batching arrangement indicator item in the user interface may be disabled. An exemplary use of batching arrangement indicators will be described further below with respect to FIG. 16.

Batch Dataset

In the present context, the expression "dataset" refers to a collection of purpose-related data records as part of a file, irrespective of format, operating system and storage mode. A suitable batch dataset is a e.g. data structure of the "sequence", "list", "bag" or similar datatype, more specifically a variable-length, preferably ordered aggregate of one or more batching records as data items possibly with plural identical items, i.e. plural identical batching records. The batch dataset is used to reflect a complete batch of raw material to be provided by the material feeding installation (ref. 10 in FIG. 1). A preferred exemplary batch dataset has the following structure:

| Item label (field identifier) | record[1] | . . . | record[n − 1] | record[n] |
|---|---|---|---|---|
| Datatype | (batching) record | . . . | (batching) record | (batching) record |

The batch dataset is preferably an ordered data structure so that the sequence of its records may be used in combination with batching arrangement indicators for pre-configuring the arrangement of sections within a batch.

As seen in FIGS. 4-5, the batch data fields are arranged in generally tabular form 128 labeled "% of used material" although other visual representations are not excluded. Each table field 130 (only some of which are identified by reference numerals in FIG. 5), i.e. each position in a given row and given column of the tabular form 128, corresponds to a batching record. In order to define or modify the recipe currently in memory (displayed in box 108), the recipe definition mode allows manually entering/editing the value of the items of each batching record, i.e. material type, batching proportion and batching arrangement indicator in a corresponding table field 130. To this effect, each table field 130 comprises three batch data fields: a material type data field 132, a batching proportion data field 134 and a batching arrangement indicator data field 136, for entering, editing and displaying the value of the respective item. The GUI data fields 132, 134, 136 as such may be of any suitable type for entering and displaying data of the required type such as an editable text box or a dropdown list. Each row in the tabular form 128 of FIGS. 4&5 corresponds to a batch dataset, i.e. the batching records displayed in a given row are items of one batching dataset. Each batching dataset has a unique identifier, e.g. an integer constant corresponding to the row number of tabular form 128 displayed in the column labeled "Batch".

A batching record is defined (non-empty) if appropriate values for both the material type and the batching proportion items are defined (non-empty), e.g. by user entry in the material type data field 132 and in the proportion data field 134. The batching arrangement indicator 136 is optional.

A batch dataset is defined (non-empty) if at least one batching record is defined (non-empty) as an item of the batch dataset. Typically, the batch datasets comprise plural i.e. more than one batching record as illustrated in FIGS. 4&5. Although merely exemplary, in the proposed embodiment up to 11 batching records may be defined for each batch dataset whereas a total of 16 batch datasets may be defined for a recipe.

FIG. 5 further shows a data field 138 for entering and displaying an integer that reflects the number of actual charges per charging cycle in accordance with the batch datasets. The corresponding integer value (ranging e.g. from 1 to 16) is entered manually by the user. A non-editable text box 140 displays the total batching proportion value for each material type determined automatically by the user interface using the number of actual charges. The total batching proportion value is to be distributed in the corresponding data fields 134 of the tabular form 128 and used e.g. for validation purposes in the "batch configuration check" subroutine (see below).

FIG. 6 shows an enlarged view of the GUI elements in the second visual region 104 of FIG. 4 used for displaying and, if required, modifying the nominal charge for the current recipe. The user interface employs two basic data structures (types) for computation of the nominal charge, namely the charge material record and the nominal charge dataset.

Charge Material Record

A suitable charge material record is e.g. a data structure of the "record" datatype and represents a type of material and its associated quantity that are to be contained in a nominal charge. Accordingly, it comprises two items: a "material type" and an associated "nominal charge quantity". A preferred exemplary charge material record has the following structure:

| Item label (field identifier) | material type | nominal charge quantity |
|---|---|---|
| Datatype | Alphanumeric or Enumerated (e.g. "string" or "enum") | Numeric (e.g.; "rational" or "(fixed-point) real") |

Properties of the material type item are identical to those of the material type item of the batching record. The nominal charge quantity expresses, in absolute terms e.g. in terms of metric tons [t], the quantity of the associated material type required in a nominal charge.

Nominal Charge Dataset

A suitable nominal charge dataset is e.g. an unordered data structure of the "bag" datatype, more specifically an unordered aggregate of plural charge material records. A nominal charge dataset reflects a nominal blast furnace charge that complies with a predetermined burden composition aiming at a desired chemistry of hot metal to be produced by the blast furnace: A preferred exemplary batch dataset has the following structure:

| Item label (field identifier) | record[1] | ... | record[n – 1] | record[n] |
|---|---|---|---|---|
| Datatype | (charge material) record | ... | (charge material) record | (charge material) record |

FIG. 6 best illustrates a tabular form 142 displaying the nominal charge dataset of the recipe currently in memory. Each column 144 of the tabular form 142 displays a charge material record, more specifically the material type value in the second line of the column 144 and the associated nominal charge quantity value in the last line of the column 144 expressed in metric tons [t]. The table fields of the tabular form 142 are non-editable data fields since the values of each charge material record, in particular the nominal charge quantities, in the nominal charge material dataset are obtained by computation as set out below. In the embodiment of FIGS. 4-6, only charge material records with an actually required material type are defined in the nominal charge dataset (variable length dataset). Hence, columns 144 of the tabular form 142 display only defined charge material records, i.e. only data for the material types that are to be actually charged.

As further seen in FIG. 6, the GUI comprises a reference basis data field 146 for entering and displaying a reference basis, which in the proposed embodiment expresses a coke layer height at throat in millimeters [mm]. The reference basis may alternatively express other suitable measures related to the blast furnace process such as a coke basis by weight, a ferrous basis by weight or a hot metal basis by weight. The reference basis is a variable of a numeric datatype (e.g. "integer"; "rational" or "(fixed-point) real" type) used for setting the absolute quantities of each material in the nominal charge in accordance with the chosen reference basis. Accordingly, the user interface uses the value of the reference basis for computing the nominal charge quantities, e.g. dry weight in metric tons [t], for each required material type based on the results of burdening calculation. An exemplary computation by means of subroutine "weights per nominal charge" will be detailed further below. The reference basis value is set by loading a recipe file or by manually entering or modifying the reference basis value using the data field 146. Upon change of the reference basis value the user interface automatically updates the nominal charge quantities.

The tabular form 142 of FIG. 6 also contains the GUI elements used for displaying and, if required, modifying the results of burdening calculation, i.e. the burden composition based on which the nominal charge is obtained. Two basic data structures (types) are employed in relation to burden composition, namely the burdening material record and the composition dataset.

Burdening Material Record,

A suitable burdening material record is e.g. a data structure of the "record" datatype. It represents a type of material and its associated quantity as required in general in terms of mass balance, e.g. per ton of hot metal, in view of producing hot metal of a desired chemistry (chemical composition), i.e. irrespective of division into (nominal) charges and batches and related material distribution in the furnace. Similar to the charge material record, the burdening material record comprises two items: a "material type" and an associated "target quantity". A preferred exemplary burdening material record has the following structure:

| Item label (field identifier) | material type | target quantity |
|---|---|---|
| Datatype | Alphanumeric or Enumerated (e.g. "string" or "enum") | Numeric (e.g.; "rational" or "(fixed-point) real") |

Properties of the material type item are identical to those set out hereinbefore. The target quantity expresses, in absolute terms e.g. in terms of kilograms per ton of hot metal [kg/tHM], the quantity of the associated material type in the burden composition obtained by automatic or manual burdening calculation aiming at a predetermined chemistry of hot metal.

Composition Dataset

A suitable composition dataset is e.g. an unordered data structure of the "bag" datatype, more specifically an unordered aggregate of plural burdening material records. A composition dataset reflects the calculated burdening composition and preferably has the following structure:

| Item label (field identifier) | record[1] | ... | record[n – 1] | record[n] |
|---|---|---|---|---|
| Datatype | (burdening material) record | ... | (burdening material) record | (burdening material) record |

Tabular form 142 also displays the composition dataset currently in memory. Each column 144 of the tabular form 142 can also be considered to represent a burdening material record, with the material type value in the second line of the column 144, the corresponding material family in the first line, and the associated target quantity value in the fourth (second but last line) of the column 144, expressed e.g. in terms of kilograms per ton of hot metal [kg/tHM]. In an alternative embodiment, for obtaining data on the nominal charge, the user interface may use a nominal charge dataset comprising charge material records that include the target quantity as a record item thus having the following structure:

| Item label (field identifier) | material type | nominal charge quantity | target quantity |
|---|---|---|---|
| Datatype | Alphanumeric or Enumerated (e.g. "string" or "enum") | Numeric (e.g.; "rational" or "(fixed-point) real") | Numeric (e.g.; "rational" or "(fixed-point) real") |

The target quantity item included in a defined charge material record may have its value defined or modified via manual user entry using form 142 or by automatic burdening calculation using command button 120. With the latter embodiment of charge material records, the data structures "burdening material record" and "composition dataset" can be omitted in the user interface.

FIG. 4 & FIG. 6 further show a button/checkbox element 148 of the GUI for use in relation to obtaining the values of the composition dataset, depending on the state of which certain data fields of tabular form 142 are locked or editable. Checkbox 148 allows the operator to choose an overwrite option allowing manual modification of the values of the composition dataset (fourth row of tabular form 148). Except in overwrite mode, the data fields of the tabular form 142 are non-editable. In overwrite mode, i.e. when checkbox 148 is checked, the data fields for the burdening material record items may be edited manually as follows: The second data field (second row) for entering and displaying the material type is editable while the first data field (first row) displaying the material family of the material type is non editable. Variable color shading (e.g. green/red) of the first and second data fields of column 144 is preferably provided also during editing in order to indicate availability of the family and the type of material from the stockhouse respectively. The third data field (third row) is non-editable since it displays the maximum number of times the material type according to the column 144 in question may be specified in any batch dataset. Variable color shading (e.g. green/orange/red) of the third data field is preferably provided in function of extractor availability and material availability for the specified material type. The fourth data field in each column 144 is editable to allow user modification of the target quantity in absolute terms, e.g. in terms of kilograms per ton of hot metal [kg/tHM], normally obtained by automatic burdening calculation e.g. using command button 120. The fifth data field of each column 245 is non-editable since it displays the nominal charge quantity computed automatically for the specified material type using the reference basis currently specified in memory as displayed in editable data field 246 (see subroutine "weights per nominal charge"). The user interface triggers recalculation of the nominal charge quantities upon change of any target quantity (fourth row) in the tabular form 142. When the overwrite mode is not selected, material types may be changed via burdening (re-) calculation, using command button 120.

Turning back to tabular form 128 of FIG. 4, column 133 comprises editable data fields for specifying respectively the start of different charges and the end of the charging cycle (e.g. using letters "C" and "E" respectively). Column 135 comprises data fields for displaying the computed volume of the batch pre-configured by corresponding batch dataset and (identical in function to column 158 of FIG. 8, see below). Column 137 comprises data fields displaying the computed (wet) weight of the corresponding batch (identical in function to column 160 of FIG. 8, see below). Column 139 comprises data fields displaying the determined material type (coke batch "C" or ferrous batch "O") of the corresponding batch (identical in function to column 162 of FIG. 8, see below). Data fields in columns 135, 137, 139 are non-editable and serve for user information.

Top-Charging Configuration View

A second view of the recipe definition view mode is illustrated in FIG. 7. This GUI view is designed for configuring the top-charging settings, i.e. operation of the top-charging installation 12, for each batch. The user interface employs a data structure (type) hereinafter referred to as top-charging parameter record for determining top-charging settings of a batch.

Top-charging Record

A suitable top-charging record is e.g. a data structure of the "record" datatype, i.e. an aggregate of several data items of different datatype. A top-charging record reflects the settings to be used for controlling how the top-charging installation 12 discharges a given batch into the blast furnace, including in particular the settings of the respective material gate valve 28-1, 28-2 and the chute drive unit 24. An exemplary top-charging record has the following structure:

| Item label (field identifier) | Datatype |
|---|---|
| batch identifier | Constant (e.g. "integer") |
| batch volume | Numeric (e.g. "(fixed-point) real") |
| batch weight | Numeric (e.g. "(fixed-point) real") |
| material type | Alphanumeric or Enumerated (e.g. "string" or "enum") |
| discharge time | Numeric (e.g. "(fixed-point) real") |
| flow rate | Numeric (e.g. "(fixed-point) real") |
| chute position | Array of numeric variables<br>Item label  quota[n]  quota[n – 1]  ...  quota[0]<br><br>Datatype  Numeric (e.g. fixed-point real, identical for all) |
| direction | Enumerated (e.g. "enum") |
| close MGV | Array of binary<br>Item label  MG_11_10  MG_10_9  ...  MG_1_CC<br><br>Datatype  Binary (e.g. Boolean) |
| starting angle | Numeric (e.g. "(fixed-point) real") |
| angle increment | Numeric (e.g. "(fixed-point) real") |

In the second view of the recipe definition mode illustrated in FIG. 7, a tabular form 154 is provided which includes a pattern of top-charging data fields for entering and displaying one or more top-charging parameter records, each row of form 154 corresponding to one top-charging parameter record, columns corresponding to the record items as set out above (with the columns labeled 11, 10, . . . 1, CC corresponding to array items of the array item "chute position"). More specifically with reference to the enlarged partial view of form 154 in FIG. 8, for each record respectively:

Column 156 comprises a non-editable data field displaying the "batch identifier" item used for association of the top-charging parameter record to a specific batch dataset, and thereby to a pre-configured batch, e.g. by bijection of the respective identifiers. Column 158 comprises a non-editable data field displaying the value of the "batch volume" item, which is the calculated total wet volume of a batch pre-configured according to the associated batch dataset, i.e. the volume that this batch occupies in a receiving hopper 20-1, 20-2 (see subroutine "check volume for receiving hopper"). Column 160 comprises a non-editable data field displaying the value of the "batch weight" item, which is the calculated total wet weight of the associated batch (see subroutine "wet weight to be extracted"). Column 162 comprises a non-editable data field that displays the value of the "material type" item, i.e. the general material type of the associated batch (as opposed to the specific material type item of the batching, charge material and burdening material records), e.g. "C" for a coke batch and "O" for a ferrous burden batch, determined by the user interface based on the associated batch dataset. Column 164 has a data field for the "discharge time" item. This data field may be either non-editable or editable depending on whether the "percent based" or the "portion based" mode is selected using radio button 174 (see below). In portion-based mode, the "quota" items in the "chute position" array reflect the number of revolutions of the distribution chute 22 at a determined pivoting angle (e.g. determined by the array index of the quota item). In the latter case, the discharge time is computed as the total number of chute revolutions across all defined quota multiplied by the revolution duration and the data field is non-editable displaying the computed value of the "discharge time" item (see subroutine "discharge time"). In percent-based mode, the "quota" items in the "chute position" array are used to reflect the percentage of the batch that is to be discharged at the corresponding pivoting angle of the distribution chute 22. In the latter mode, the data field is editable and the value of the total "discharge time" in column 164 is user-specified. Column 166 has a non-editable data field for the "flow rate" item, determined by the user interface dividing the batch volume by the discharge time.

For each top-charging parameter record, the sequence of columns 170 in the tabular form 154 comprises respective editable data fields used for entering and displaying chute position quota, in particular the values of each array item of the "chute position" array. Each quota item of a top-charging parameter record and thus each column of the sequence 170 corresponds to a different chute pivoting/tilting angle of the distribution chute 22, for example column labeled "CC" (quota[0]) represents the central charging position and column labeled "11" represents the charging position for the outermost region on the stock-line. The array indexes of the "chute position" array thus suitable angular increments according to which the chute 22 is pivoted, preferably increments decreasing towards the furnace wall as set out in U.S. Pat. No. 3,929,140, e.g. according to the following example:

| Index/label | 0/CC | 1 | 2 | 3 | 4 | 5 | 6 | 7 | 8 | 9 | 10 | 11 |
|---|---|---|---|---|---|---|---|---|---|---|---|---|
| tilt angle | 5° | 8° | 16.3° | 23° | 28.5° | 33.3° | 37.4° | 41° | 44.3° | 47.3° | 50.3° | 53.5° | with the tilt angle being measured as the angle between the chute centerline and the vertical furnace axis.

Depending on the "percent based" or the "portion based" mode, the data fields of column sequence 170 are used to specify as values of the quota items for the corresponding pivoting angle either the number of revolutions of the chute 22 or a percentage of the associated batch. Hence, the value of each quota item determines the share of the associated batch to be discharged into the furnace at the corresponding pivoting angle/tilting position of the chute 22. Column 172 comprises an editable data field, e.g. a dropdown list, for specifying one of two, possible chute pivoting directions according to which the chute 22 is tilted for discharging the associated batch, i.e. either the center-to-wall direction ("W<-C") or the wall-to-center direction ("W->C") as value of the "discharge direction" item. As further seen in FIGS. 7-8 for each consecutive pair of quota items a check box 169 is provided. Check box 169 serves for specifying whether or not the respective material gate valve 28-1, 28-2 is to be closed during the time the chute drive unit 24 pivots the distribution chute 22 between the corresponding angular positions. The setting of each checkbox for a given row is stored in the array "close MGV" of the top-charging record allowing controlled closure of the material gate valve 28-1, 28-2 for each change of angular position respectively. Furthermore, the form 154 comprises additional columns 171, 173 with editable data fields for specifying the values of the "starting angle" and "angle increment" items of each top-charging record respectively. The starting angle value may be used for controlling at which absolute rotational position of the distribution chute 22 (0-360° about the vertical axis) the discharge of the associated batch is to start. The angle increment value may be used for controlling at which rotational position of the distribution chute 22 the discharge of the associated batch is to start compared with the preceding discharged batch. The items "close MGV", "starting angle" and "angle increment" are optional.

As seen in FIG. 7, the second GUI view in recipe definition mode further comprises a radio button element 174 for manually switching between the "percent based" mode and "portion based" mode set out above, with the user interface adapting computations accordingly.

As further seen in FIG. 7, the top-charging configuration view further comprises the following user operable command buttons:

"CHECK TABLE" button 180 for calling a subroutine (see "matrix check" below) used for checking and validating correctness of the top-charging parameter records as currently in memory and displayed in tabular form 154;

"UPDATE MATRIX . . . " button 182 (optional) for automatically obtaining and updating top-charging parameter records appropriate for discharging the batches pre-configured by the batch datasets of the current recipe using an optional external software module;

"RECIPE" button 184 for switching to/activating the first GUI view (see BATCH CONFIGURATION VIEW).

Values for the top-charging parameter records, in particular values of the chute position quota (array items) may thus be obtained either by manual entering using the GUI view of FIG. 8, by loading a stored recipe file using command button 112, or as an optional possibility, automatically based on the batch datasets using an external software model by means of command button 182.

In an alternative embodiment, the chute position item of the top-charging parameter records may be a variable length data structure of the list type having list items dedicated to chute positions but allowing for a shorthand notation of the discharging pattern taking into account the order of the list items. More specifically, each list item itself can comprise a record comprising a position indicator item, a quota item and a pattern selection item (optional, "S" for choosing a spiral discharge pattern or "X" for specifying a material gate closure between two successive chute positions for a pattern of concentric rings) with the direction of chute motion being implicitly indicated by subsequent position indicators in the ordered list. For example, as an alternative to a fixed position column sequence:

| 11/60/S | 1/40/S | 10/_/_ |
|---------|--------|--------| where the numeral before the first slash sign "/" is the position indicator representing the chute position and the value behind the first slash is the quota item representing either the percentage to be discharged or the number of chute revolutions (depending on whether the percentage- or portion-based mode has been selected) on the path to the following specified chute position. With the above example, the chute is moved continuously (in accordance with a spiral pattern: "S") from wall to center from the outermost position 11 to an inner position 1 discharging 60% of the batch during this travel and then moved back continuously from center to wall towards position 10 discharging the remaining 40% of the batch. In percentage-based mode, the number of chute revolutions at a given position for a concentric-ring pattern or, for a spiral pattern, between successive chute positions (i.e. spiral turns) can be determined using the requested flow rate, the specified percentage to be discharged and the chute rotation speed.

Figure 17:
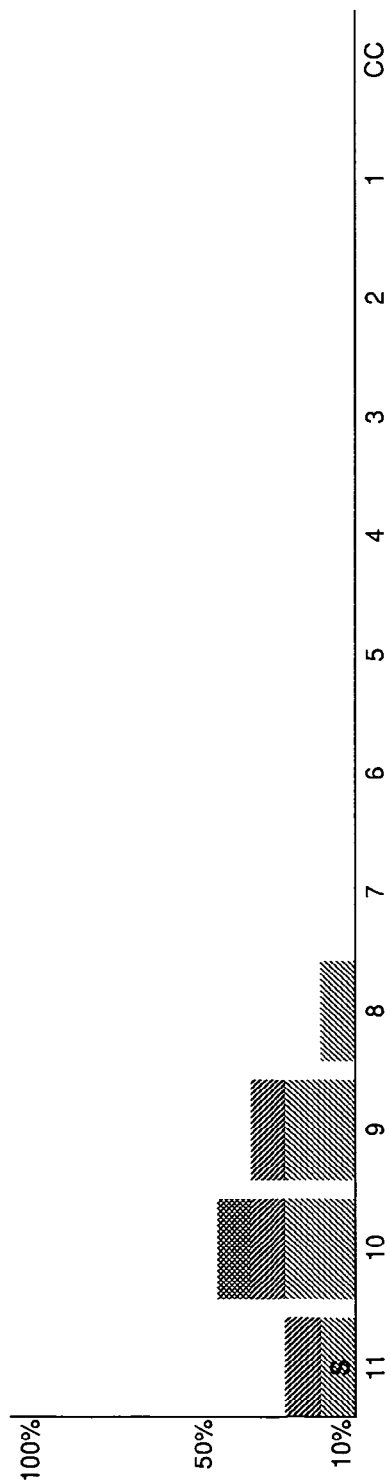
FIG. 17 is a graph of the bar chart type for visualizing the top-charging pattern of a batch.

FIG. 17 illustrates a graph for visualizing the top-charging pattern of a batch as determined by a top-charging parameter record, in particular when using the above shorthand notation. As apparent from FIG. 17, discrete chute positions are represented on the axis of abscissas (x-axis) whereas the quantity of material to be discharged (e.g. in %) at the given chute position is represented on the ordinate axis (y-axis). Preferably, the graph is of the bar chart type with the chart categories reflecting the chute positions and the height of each bar expressing the respective quantity to be discharged at a certain position. The graph thereby gives an intuitive indication of the distribution profile in vertical section. A discharge start indicator is provided on the graph, e.g. as in form of a letter "S" for unambiguous identification of the initial chute position. Different highlighting is provided in accordance with the direction of chute position change, i.e. the center-to-wall direction or the wall-to-center direction, preferably using a different highlighting, e.g. color or hatching, of the represented quantity each time the direction changes. For example, with a top-charging pattern according to the graph of FIG. 17, the chute is tilted from wall to center from starting at position 11 through positions 10 and 9 to position 8, then from center to wall through positions 9 and 10 back to position 11 and then again from wall to center to position 10, corresponding to the following shorthand notation:

| 11/10/X | 10/20/X | 9/20/X | 8/10/X | 9/10/X | 10/10/X | 11/10/X | 10/10/X. |
|---------|---------|--------|--------|--------|---------|---------|----------|

As will be appreciated, irrespective of the data format used for defining the top-charging parameter record, a graph according to FIG. 17 may be included in the GUI as part of the top-charging configuration view of FIG. 7, e.g. with a respective graph for each defined top-charging parameter record, and also in the top-charging operation view of FIG. 10 (see below).

Batch Operation View

Figure 9:
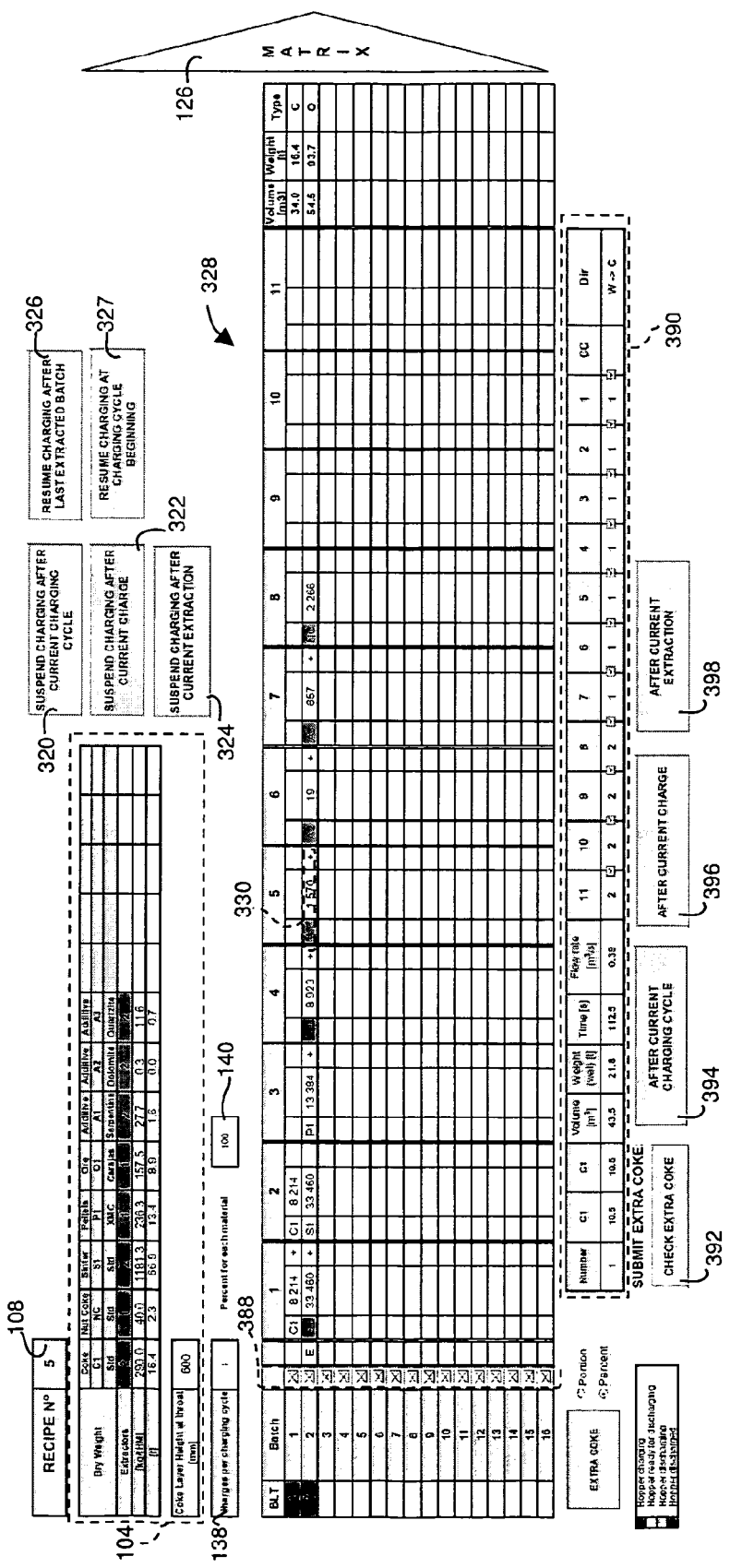
FIGS. 9-10 are screenshots respectively showing first and second GUI views (batch operation view/top-charging operation view) in recipe operation mode of the user interface.

The GUI view illustrated in FIG. 9 is a first view designed for displaying the batch settings currently in operation and additional related operational information obtained from control devices $c_i$ at the material feeding installation 10 and the top-charging installation 12. The view of FIG. 9 is displayed when the user interface is in recipe operation mode, e.g. after use of command button 124. This view recipe is based on the batch configuration view of FIG. 4 with respect to which certain GUI elements are identical e.g. elements 108, 126, 138, 140. The data fields of visual region 104 and data field 138 of FIG. 10 are displayed in the batch operation view according to FIG. 9 but non-editable.

In the batch operation view of FIG. 9, a tabular form 328 is displayed which is based on the tabular form 128 of FIG. 4. Notable differences are set out hereinafter. The receiving hopper 20-1, 20-2 to which a batch is (being) charged is identified in the first column (labeled "BLT"). Additional command buttons for each row of form 328 are provided in column 388 by means of which a batch pre-configured in the current batch dataset can be removed from the current charging cycle. All data fields of form 328 are non-editable. The three respective data fields of each table field 330 are used display the progress status of the batch that is currently being provided by the material feeding installation 10. To this effect, the material type data field of the batch in question is shaded/highlighted in a color determined according to the operational status, e.g. as follows:

Red: "hopper charging" indicating that the weighing hopper 16-1 . . . 16-$n$ for the respective material type is currently being refilled;

Yellow: "hopper ready for charging" indicating that the weighing hopper 16-1 . . . 16-$n$ for the respective material type is ready for being refilled;

Orange: "hopper discharging" indicating that the extractor 18-1 . . . 18-$n$ of the weighing hopper 16-1 . . . 16-$n$ for the respective material type is currently extracting a section of this material;

Green: "hopper discharged" indicating that the section of the respective material type has been batched onto the conveyor 14 for the given batch.

A corresponding color-coded legend is displayed in the batch operation view as seen in FIG. 9. Furthermore, where applicable, the middle data field of each table field 330 is used to display the weight of the corresponding material type to be extracted, i.e. for control of the respective extractor 18-1 . . . 18-$n$ as computed using the batching proportion defined in the recipe file and the nominal charge quantity (see visual region 104), e.g. according to the subroutine "weights per nominal charge" below.

As seen in FIG. 9, the batch operation view further comprises the following user command buttons for stopping the charging procedure manually:

button 320 for suspending operation of the material feeding installation 10 after the entire charging cycle currently in operation has been fed to the top-charging installation 10;

button 322 for suspending operation of the material feeding installation 10 after the charge currently in operation has been fed;

button 324 for suspending operation of the material feeding installation 10 after the batch currently being batched has been fed;

and the following command buttons for resuming operation of the material feeding installation 10:

button 326 for resuming operation of the material feeding installation 10 with the batch of the current recipe that follows the batch that was last fed to the to the top-charging installation 10;

button 327 for resuming operation of the material feeding installation 10 beginning with the first batch of the charging cycle according to the current recipe.

For configuring an extra coke charge, the batch operation view further comprises a tabular form 390 with an associated radio button for discharge mode selection. The properties and functionality of the GUI elements of tabular form 390 correspond to those of the tabular form 154 of FIG. 7 with additional data fields provided (in the second and third column) for entering and displaying the quantity of coke to be charged (e.g. in metric tons [t]). Data pre-configuring an additional coke batch may be stored in the recipe file using a dedicated top-charging record.

In order to control charging of a supplementary coke charge, the batch operation view provides user the command buttons:

button 392 for calling a subroutine (see subroutine "extra coke check" below) checking and validating correctness of data in tabular form 390;

button 394 for charging an extra coke charge as pre-configured in form 390 after the charging cycle currently in operation (see subroutine "extra coke after current charging cycle");

button 396 for charging an extra coke charge as pre-configured in form 390 after the charge currently in operation (see subroutine "extra coke after current charge");

button 398 for charging an extra coke charge as pre-configured in form 390 after the batch currently being batched has been fed operation (see subroutine "extra coke after current batch").

Command button 126 allows switching to/activating the second view of the GUI in recipe operation mode.

Top-Charging Operation View

Figure 10:
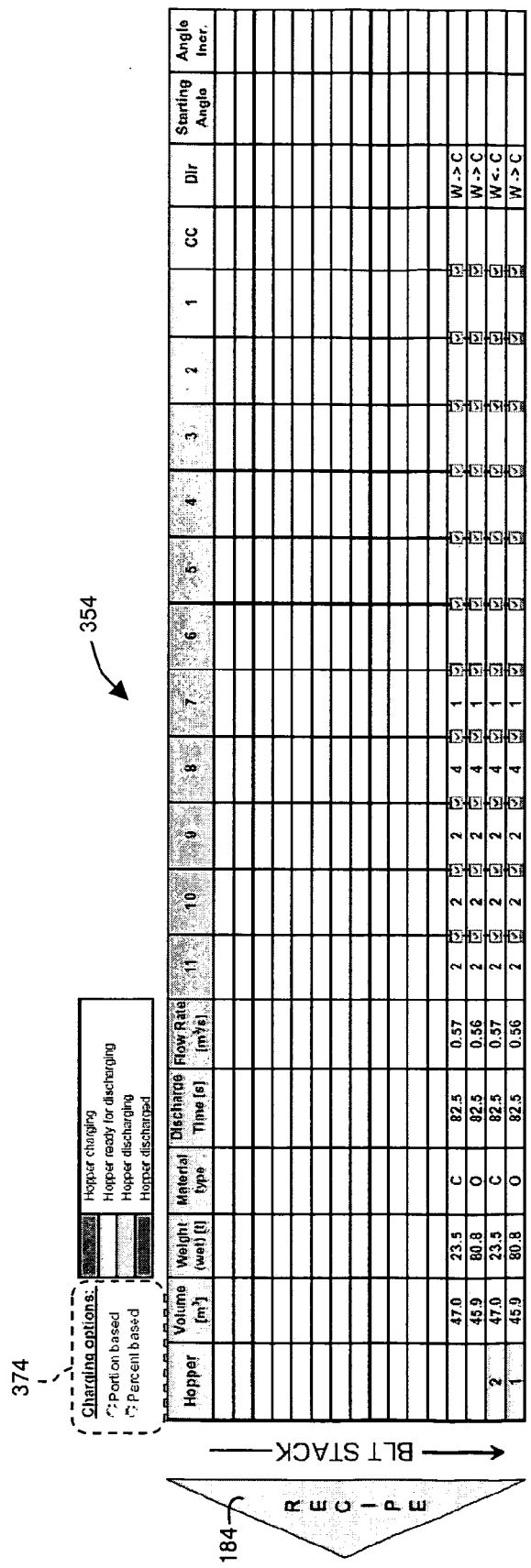

FIG. 10 illustrates the second GUI view in recipe operation mode. This view is used to display the settings used for controlling the top charging installation 12 to discharge the batches pre-configured by the current recipe, more specifically the settings affected to the batches that are produced but not yet discharged into the furnace. The settings are displayed using a tabular form 354 that is generally identical in properties to the form 154 of FIG. 7, with the first column identifying the receiving hopper 20-1, 20-2 from which the batch associated to the displayed top-charging parameters is discharged. The operational status of the receiving hoppers 20-1, 20-2 is displayed by color shading/highlighting identical to that used in the view of FIG. 9. The display order of the rows of top-charging parameters in tabular form 354 is inverted with respect to tabular form 154 with only the batches already produced or in production by the material feeding installation that are not yet charged into the blast furnace being shown in chronological order, thereby reflecting the current batch production queue that cannot be modified. For example tabular form 154 chronologically shows in the lowermost rows the two batches contained in or currently discharged from a receiving hopper 20-1, 20-2, in the uppermost row the batch being currently produced by the material feeding installation 10 and there between a batch currently transported by the conveyer 14. Radio button 374 is non-editable and displays the applicable discharge mode. Command button 184 allows to switch to/activate the batch operation view of FIG. 9.

As will be understood, the actual visual appearance and arrangement of the GUI elements, i.e. the graphical components with which the user interacts, in the various views illustrated and described hereinbefore is, as opposed to their functionality, merely exemplary. Implementation of the various GUI views can be made in a manner known per se e.g. using standard GUI toolkits.

Extractor Table & Material Table

The user interface comprises an extractor table that contains information relevant for controlling charging of the blast furnace.

In a preferred embodiment, the extractor table is organized by weighing hopper extractors and comprises for each such extractor a record comprising e.g. the following stockhouse-related items (additional data not being excluded):

a weighing hopper extractor name/Identifier an identifier of the storage bin the weighing hopper extractor belongs to (not necessarily shown to the user)

an identifier of the blast furnace the extractor belongs to (not necessarily shown to the user)

the extractor line availability (e.g. with Y symbolizing an available line, "N" symbolizing an unavailable line)

the material/burden family (normally limited to: Coke, Nut Coke, Sinter, Pellets, Ore, Additive, Pig Iron, Scrap, DRI)

the material type (normally limited e.g. to: C1, C2, C3, NC, S1, S2, S3, P1, P2, P3, O1, O2, O3, A1, A2, A3, A4, A5, A6, SC, PI, DR)

a brand name or description of the material a value indicating density of material a value indicating humidity of material a value indicating the maximal admissible extraction volume for the weighing hopper to which the extractor is associated a value indicating the rated extraction flow rate of the extractor a chemical analysis code (unique code from laboratory)

chemical analysis data of material inside the storage bin to which the extractor is associated.

FIGS. 11-12 illustrate exemplary GUI views of the user interface for editing and displaying the table contents. The view of FIG. 11 is used for data related to the physical properties whereas the view of FIG. 12 is used for data concerning the chemical composition of the material.

Using the extractor table, the user interface derives a "material table" (by material types), which is specific to one furnace in case the material feeding installation 12 supplies more than one blast furnace. For each furnace, the user interface creates a dedicated material table. The material table contains relevant information used in the batch and top-charging configuration views and by subroutines of the user interface (see below).

The material table(s) will be created automatically be the user interface, e.g. as follows: firstly, for each material/burden family (in the following order: Coke, Nut Coke, Sinter, Pellets, Ore, Additive, Pig Iron, Scrap, DRI,) the number of available different material types are determined. Then an entry (record) for each different material type is made in the file. For each entry the following data is determined and included:

- amount of available weighing hopper extractors for this material;
- list of extractors corresponding to this material type (the values are only considered if the extractor is active and care is taken not the include duplicates of a storage bin);
- list of storage bins corresponding to this material type (the values are only considered if the extractor is active and care is taken not the include duplicates of a storage bin)
- list of brands corresponding to this material type (the values are only considered if the extractor is active and care is taken not the include duplicates of a storage bin).
- average density of material (average is calculated only for active extractors) average humidity of material (average is calculated only for active extractors) extraction volume for weighing hopper (the minimum weighing hopper volume is calculated only for active extractors)
- extraction rate for weighing hopper (the maximum extraction rate of extractors is calculated only for active extractors)
- average chemical composition (Average is calculated only for active extractors).

An exemplary material table (by material types) is illustrated in FIG. 13.

Subroutines

Subroutines are described hereinafter using pseudo-code and mathematical formula for the purpose of disclosure but not specific to any particular programming language. The user interface implements the following subroutines used, especially in relation to the batch configuration view (see FIG. 4) in recipe definition mode:

```
SUBROUTINE: "put into production"
IF PUSHING button "PUT INTO PRODUCTION" THEN
   call SUBROUTINE "batch configuration check"
   call SUBROUTINE "matrix check"
ENDIF
IF batch configuration check = TRUE AND matrix check =
TRUE THEN
   call SUBROUTINE "show weights"
   RETURN QUESTION "Are the values OK?"
   IF ANSWER = "YES" THEN
      call SUBROUTINE "Update matrix"
      RETURN MESSAGE "Recipe put into production"
      call SUBROUTINE "show percentages"
   ENDIF
   IF ANSWER = "NO" THEN
      RETURN MESSAGE "Recipe not put into production"
      call SUBROUTINE ""show percentages"
      EXIT "Put into production" SEQUENCE
   ENDIF
ELSE
   RETURN MESSAGE "Recipe not put into production"
ENDIF
DISABLE button "PUT INTO PRODUCTION"
WHEN call SUBROUTINE "Update matrix" SUCESSFUL
   ENABLE button "PUT INTO PRODUCTION"
END
```

The above subroutine is called by clicking button 124. The following subroutine is called either by clicking button 122 or from other subroutines such as "put into production":

```
SUBROUTINE: "batch configuration check"
IF PUSHING button "CHECK BATCH COMPOSITION"
OR CALLED THEN
   call SUBROUTINE "Check if mixing of ferrous burden and coke"
   call SUBROUTINE "Check volume for weighing hopper"
   call SUBROUTINE "Check volume for receiving hopper"
   call SUBROUTINE "Check percentage request for each material type"
   call SUBROUTINE "Check overfilling of conveyor"
   call SUBROUTINE "Check number of available extractors"
   call SUBROUTINE "Check pellets position on belt"
   call SUBROUTINE "Check availability of requested types"
ENDIF
   IF any check FAILED except "Check if mixing of ferrous burden
   and coke" THEN
      RETURN batch configuration check = FALSE
   ELSE
      RETURN batch configuration check = TRUE
   ENDIF
```

Some of the following subroutines use data contained in the material table created by the user interface.

```
SUBROUTINE: "weights per nominal charge"
``` h(coke, throat) = reference basis value
d(throat) = furnace throat diameter
FOR EACH i=material type having material family == COKE in nominal charge dataset
    LOAD ω(i) = average humidity of material from material table
    LOAD ρ(i, coke) = average density of material from material table
    m(coke, i) = nominal charge quantity
END
CALCULATE $$V_{coke} = \sum_i m_{(coke;i)} \cdot \frac{1}{1 - \frac{\omega_i}{100}} \cdot \frac{1}{\rho_{(coke;i)}}$$

$$V_{charge} = \frac{\pi \cdot d_{throat}^2}{4} \cdot h_{(coke;throat)}$$

$$\alpha = \frac{V_{charge}}{V_{coke}} \cdot \frac{1}{1000}$$

FOR EACH i=material type defined in nominal charge dataset
    CALCULATE
        nominal charge quantity = α · target quantity
END The above routine is used to calculate the (dry) weights for each material to be contained in a nominal charge, i.e. the value of each nominal charge quantity item in the nominal charge dataset. It first calculates the targeted volume of coke according to burdening calculation i.e. the (dry) volume of the specified target quantity of each requested coke type. Then it calculates the volume of coke material required in a nominal charge using the specified reference basis (e.g. coke layer height at furnace throat) and a conversion ratio for the nominal charge quantity corresponding to the ratio of total targeted volume of coke and nominal volume of coke (multiplied by a factor for unit conversion e.g. from [kg/tHM] to [t]). The nominal charge quantity for defined each material type corresponds to its target quantity multiplied by this conversion ratio.

```
SUBROUTINE: "wet weight to be extracted"
```

FOR EACH j=batch dataset
FOR EACH i=material type in batching record
    LOAD ω(i) = average humidity of material from material table
    %(requested, i) = batching proportion of material type i

| SUBROUTINE: "wet weight to be extracted" |
| --- |
| m(i) = nominal charge quantity of material type i
CALCULATE $$m_{(BLT;batch_j)} = \sum_{i \in batch_j} m_i \cdot \frac{\%_{(requested;i)}}{100} \cdot \frac{1}{1 - \frac{\omega_i}{100}}$$

IF batch identifier of top charging record == j
batch weight of top charging record j = m(BLT, batch j)
ENDIF
END
END |

The above subroutine computes the total (wet) weight of each batch as pre-configured by the respective batch dataset based on the batching proportion and the nominal charge quantity defined for each material type of the batch dataset.

Subroutine: "Show Weights"

This subroutine substitutes, for each defined batching record, the batching proportions displayed in the corresponding data field data field 134 of the tabular form 128 by the (dry) weight computed for the corresponding material, according to the formula:

$$m_i \cdot \frac{\%_{(requested;i)}}{100}$$

with "% (requested, i)" being the batching proportion of the corresponding batching record expressed in percent and "$m_i$" being the nominal charge quantity of the associated material type specified in the nominal charge dataset.

Subroutine: "Show Percentages"

This subroutine displays the batching proportions in each data field data field 134 of the tabular form 128 for each defined batching record.

The user interface further implements a number of checks for checking correctness and validating the data of the nominal charge dataset and the batch datasets of the current recipe using the following subroutines:

Subroutine: "Check Number of Available Extractors"

In order to check whether the respective material types of each batching record in the defined batch datasets are available in the material feeding installation 10, this subroutine compares the number of extractors 18-1, 18-2 . . . 18-n as required according to the material types defined in the batch dataset with the number of extractors 18-1, 18-2 . . . 18-n available for this material type according to the material table. If the number of required extractors exceeds the number of available extractors, a warning message is displayed, e.g:

"Batch i: too many extractors specified for material type S1"

Subroutine: "Check Volume for Weighing Hopper"

In order to check whether the batching quantity associated to the respective material type does not exceed the batching capacity of the material feeding installation 10 for the respective material type, this subroutine calculates the volume to be extracted, e.g. as follows:

$$V_{(i;batch_j)} = m_i \cdot \frac{\%_{(requested;i)}}{100} \cdot \frac{1}{\rho_i} \cdot \frac{1}{1 - \frac{\omega_i}{100}}$$

with "% (requested, i)" being the batching proportion of the corresponding batching record expressed in percent, "$m_i$" being the nominal charge quantity of the associated material type specified in the nominal charge dataset, "$\rho_i$" and "$\omega_i$" being the average material density and humidity respectively of the respective material type loaded from the material table. The subroutine then compares the computed volume ("$V_{(i;\ batchj)}$") requested with the maximum capacity of the corresponding weighing hopper 16-1 . . . 16-n according to the material table. If the requested volume exceeds the allowable extraction volume, a warning message is displayed, e.g:

"Batch i: requested volume exceeds weighing hopper capacity"

Subroutine: "Check Volume for Receiving Hopper"

In order to check whether the batch of raw material pre-configured by a batch dataset does not exceed the receiving capacity of the top-charging installation 12, i.e. the useful volume of a receiving hopper 20-1, 20-2, this subroutine calculates the total volume of the pre-configured batch, e.g. as follows:

$$V_{(BLT;batch_j)} = \sum_{i \in batch_j} m_i \cdot \frac{\%_{(requested;i)}}{100} \cdot \frac{1}{\rho_i} \cdot \frac{1}{1 - \frac{\omega_i}{100}}$$

with the symbols being as set out for subroutine "check volume for weighing hopper". If this total volume of the pre-configured batch exceeds the admissible receiving hopper capacity, a warning message is displayed, e.g:

"Batch i: BLT hopper will be overfilled (65 m³)"

Subroutine: "Check Percentage Request for Each Material Type"

In order to check whether the nominal charge is respected, this subroutine calculates, for each material type defined in the nominal charge record, the sum of all batching proportions associated to a respective material type in a charging cycle, i.e. across all defined batch datasets. This sum must be equal to the total batching proportion value (e.g. the total percentage to be extracted as displayed in text-box 140, 140) for each material type in order reflect the whole nominal charge quantity of the respective material type, otherwise the subroutine generates a warning message, e.g.:

"Percentage for S1 is not equal to 100%"

Furthermore, the subroutine checks whether any material type is requested in the defined batch datasets that is not defined in the nominal charge record and issues an alarm if required.

Subroutine: "Check if Mixing of Ferrous Burden and Coke"

In order to check whether the respective material types of each batching record in a defined batch dataset are compatible, this subroutine checks whether the batching records of the same batch dataset contain a material type of the material family "coke" and of any ferrous material family, e.g. "sinter"/"pellets"/"ore". If such mixture is defined, the subroutine generates a warning message, e.g.:

"Batch i: coke and burden are mixed"

Subroutine: "Check Availability of Requested Types"

In order to check whether the requested material types are available from the material feeding installation 10, this routine compares all material types defined in the charge material records of the nominal charge dataset with the material type entries in the material table. If a material is specified in the nominal charge dataset for which no entry exists in the material table, a warning message is displayed, e.g.:

"Material "S3" is currently not existing/available"

Further optional subroutines are preferably implemented in order to check whether the material feeding installation 12 is capable of providing a batch of raw material in the manner pre-configured by a batch dataset. For the specific case of a belt-type conveyor 14, the following subroutines are included:

Subroutine: "Check Overfilling of Conveyor"

If the combined extraction rate of material onto on the main conveyor for a batch dataset exceeds the specified conveyor belt capacity a warning message is generated. The combined extraction rate is calculated as the sum of the extraction rates loaded from the material table for the material types to be batched jointly according to their batching arrangement indicators. Example:

"Batch 1: extraction flow rate is too high for main conveyor"

Subroutine: "Check Pellets Position on Belt"

This subroutine takes advantage of the ordered data structure of the batch datasets. If a material type of the family "pellets" is pre-configured to form the last section of a batch an warning message is generated, e.g.

"Batch 1: pellets alone in last section of batch".

If a material type of the family "pellets" is preconfigured to be batched in a non-layered section (section containing pellets alone) which differs from the last section of the batch sequence a warning message is generated, e.g.

"Batch 1: pellets alone in a section of the batch"

For the specific case of a skip conveyor 14, the following optional subroutine is preferably included:

Subroutine: "Check Overfilling of Skip"

If the combined extraction volume of material into a skip for a batch dataset exceeds the specified skip capacity a warning message is generated. The combined extraction volume is calculated by the user interface for sections discharged into the same skip (in similar manner to the calculation of subroutine "check volume for receiving hopper") i.e. taking into account any batch splitting into skips defined in the given batch dataset by means of batching arrangement indicators however. Example:

"Batch 1: extraction volume exceeds skip capacity"

In relation to use of the top-charging configuration view (see FIG. 7), the user interface implements the following subroutines:

```
SUBROUTINE: "matrix check"
IF PUSHING button "CHECK MATRIX" OR
CALLED THEN
    call SUBROUTINE "check batch number""
    call SUBROUTINE "check flow rate"
    call SUBROUTINE "check charging direction"
    call SUBROUTINE "check percentage input"
ENDIF
IF any check FAILED THEN
    RETURN matrix check = FALSE
ELSE
    RETURN matrix check = TRUE
ENDIF
```

The above subroutine is provided for checking the correctness of the top-charging parameter records specified for the current recipe. Examples for subroutines used therein are as follows:

Subroutine: "Check Batch Number"

If the number of defined top-charging parameter records does not correspond to the number of defined batch datasets for the current recipe, a warning message is generated, e.g.

"Number of defined batches is incorrect"

Subroutine: "Discharge Time"

This subroutine calculates the discharge time for "portion based" discharge mode, as follows:

$$t = \sum_{i \in batch_j} n_i \cdot \frac{60[s]}{RPM}$$

with "$n_i$" being the number of revolutions specified for a defined chute position quota (array item "quota[n]") and RPM reflecting the predefined rotational speed at which the chute 22 is rotated about the vertical axis by the chute drive unit 24. The computed result is displayed for each top-charging record in the data fields column 164 of tabular form 154. In "percent based" mode the discharge time is user specified.

Subroutine: "Check Flow Rate"

The flow rate is computed in this subroutine by dividing the batch volume using the result of SUBROUTINE: "check volume for receiving hopper" by the discharge time. If the resulting flow rate is not within the range from minimum to maximum discharge rate (predefined according to the properties of the top-charging installation 12), a warning message is displayed, e.g.:

"Batch 1: discharge rate is too low"

Subroutine: "Check Percentage Input"

For the "percent based" discharge mode, this subroutine computes the sum of the percentages specified (i.e. values of "quota[n]" array items) for each top-charging record respectively. If the result is not equal to 100 percent, a warning message is displayed:

"Batch 1: allocated percentage sum differs from 100"

Subroutine: "Check Charging Direction"

This subroutine checks whether a value is specified for the direction item of each top-charging record respectively and, if a value is missing, displays a warning message:

"Batch 1: no charging direction specified"

In relation to the operation view mode, especially the batch operation view (see FIG. 9), the following subroutines are implemented:

```
SUBROUTINE: "remove a batch"
IF PUSHING button "remove batch line" THEN
    IF current batch number in actual matrix > batch to delete THEN
        MESSAGE "the batch cannot be deleted"
    ELSE
        WARNING "Do you really want to delete the batch?"
        IF ANSWER = YES THEN
            REMOVE line with the corresponding number in actual
            matrix
            SHIFT UP the lines below
        ENDIF
    ENDIF
ENDIF
```

This subroutine is executed in case of use of any of the command buttons in column 388 of the tabular form 328. Further details of the data structure termed "actual matrix" are given below with respect to FIG. 14.

```
SUBROUTINE: "extra coke after current charging cycle"
IF PUSHING button "AFTER CURRENT EXTRACTION" THEN
    CALL SUBROUTINE "Extra coke check"
ENDIF
IF extra coke check = TRUE THEN
    INSERT extra-coke lines in actual matrix after last charging cycle
    line (do not overwrite
```

-continued

```
        any lines, shift them down)
        CALL SUBROUTINE "Update matrix"
        RETURN MESSAGE "Extra coke put into production"
    ELSE
        RETURN MESSAGE "Extra coke not put into production"
    ENDIF
```

The above subroutine is executed when command button 394 is used.

```
SUBROUTINE: "extra coke after current charge"
IF PUSHING button "AFTER CURRENT EXTRACTION" THEN
    CALL SUBROUTINE "Extra coke check"
ENDIF
IF extra coke check = TRUE THEN
    INSERT extra-coke lines in actual matrix after the charge that is
    currently extracted (do not overwrite any lines, shift them down)
    CALL SUBROUTINE "Update matrix"
    RETURN MESSAGE "Extra coke put into production"
ELSE
    RETURN MESSAGE "Extra coke not put into production"
ENDIF
```

The above subroutine is executed when command button 396 is used.

```
SUBROUTINE: "extra coke after current batch"
IF PUSHING button "AFTER CURRENT EXTRACTION" THEN
    CALL SUBROUTINE "Extra coke check"
ENDIF
IF extra coke check = TRUE THEN
    INSERT extra-coke lines in actual matrix after the batch that
    is currently extracted (do not overwrite any lines, shift them down)
    CALL SUBROUTINE "Update matrix"
    RETURN MESSAGE "Extra coke put into production"
ELSE
    RETURN MESSAGE "Extra coke not put into production"
ENDIF
```

The above subroutine is executed when command button 398 is used.

```
SUBROUTINE: "extra coke check"
IF PUSHING button "CHECK EXTRA COKE" OR CALLED THEN
    CALL SUBROUTINE "Check volume for weighing hopper"
    CALL SUBROUTINE "Check volume for receiving hopper"
    CALL SUBROUTINE "Check flow rate"
    CALL SUBROUTINE "Check overfilling of conveyor"
    CALL SUBROUTINE "Check availability of requested types"
    CALL SUBROUTINE "Check number of available extractors"
ENDIF
IF any check FAILED THEN
    RETURN extra coke check = FALSE
ELSE
    RETURN extra coke check = TRUE
```

This subroutine uses checks similar to those called by subroutine: "batch configuration check" set out further above.

Data for Process Control: Matrix Data Block

Figure 14:
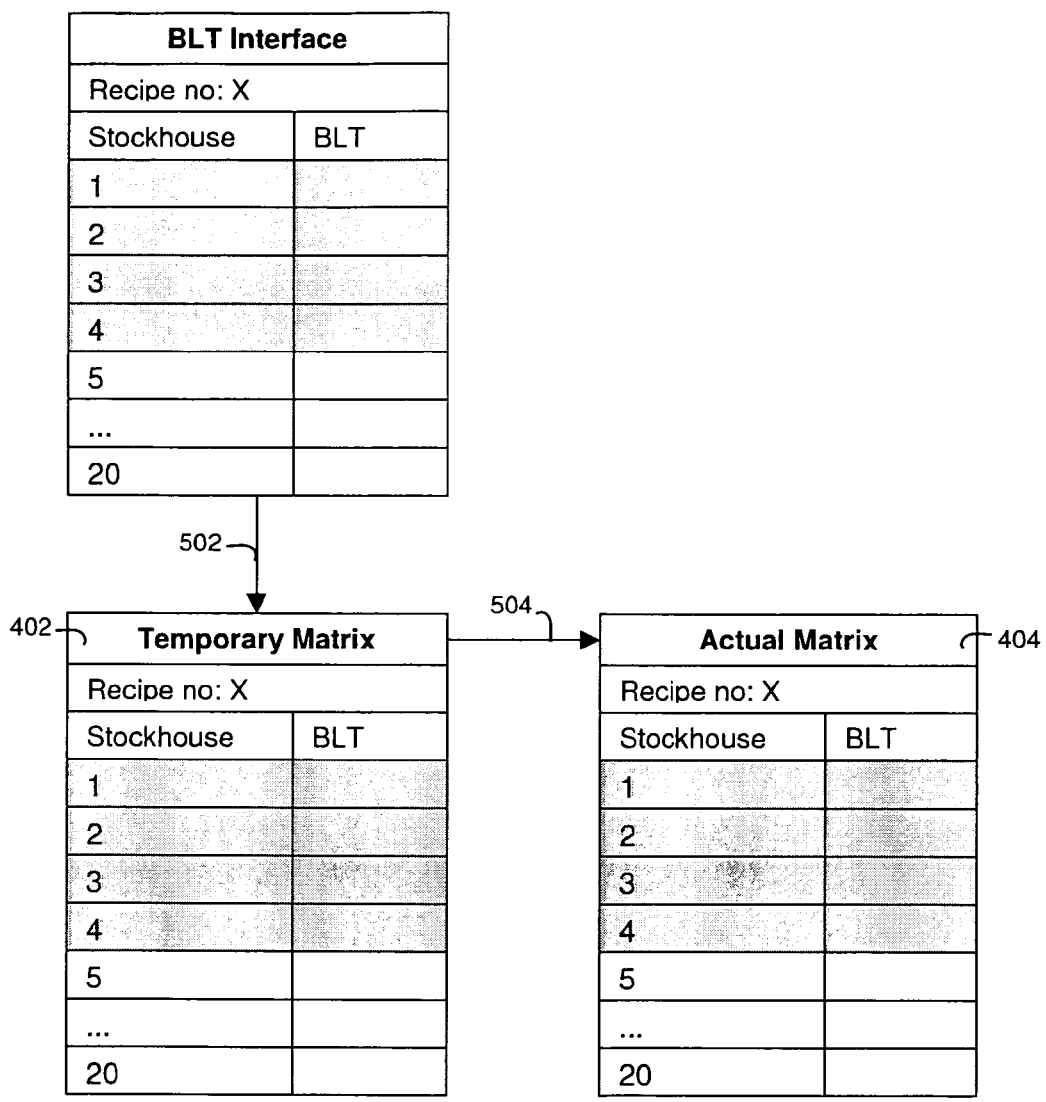
FIG. 14 is a block schematic diagram illustrating files and data flow used for process control.

The schematic diagram of FIG. 14 illustrates the structure and use of a temporary matrix data block 402 and an actual (current) matrix data block 404 created by the user interface and stored in memory, e.g. both at PLC level. Only the shaded fields (rows) in the files 402 and 404 contain data. For simplification, a charging cycle comprising only four batches is illustrated although data of e.g. up to 16 charging cycle batches and four additional coke charges can be stored in the data structures 402, 404.

As illustrated in FIG. 14, in step 502, i.e. when the "put into production" subroutine calls a subroutine "update matrix" (see below), the user interface copies the data of the batch datasets and top-charging records currently in memory of the server 42 or computer 46 in accordance with the batch configuration and top-charging configuration views (see FIG. 4 & FIG. 7) to the temporary matrix data block 402 stored in a PLC. Suitable software for communicating with the PLCs, such as an OLE for Process Control (OPC) server is run on the server 42 or the computer 46. After all the batches of the charging cycle have been batched by the material feeding installation 10, the data of the temporary matrix data block 402 is used to overwrite the data in the actual matrix data block 404 in step 504. Step 504 is repeated whenever a charging cycle has been completed, i.e. when the last batch of a charging cycle has been produced by the material feeding installation 10. Hence, at PLC level data of the actual matrix data block 404 is regularly overwritten automatically by the data of the temporary matrix data block 402, whereas the data of the temporary matrix data block 402 is only overwritten upon user request via the HMI. Data contained in the actual matrix data block 404 is used in the control devices $c_i$ to control the material feeding installation 10 and the top charging installation 12. As will be appreciated, provision of the additional actual matrix data block 404 allows user intervention in recipe operation mode to modify the current charging cycle so as to deviate from the current recipe data stored in the temporary matrix data block 402, e.g. by adding extra coke batches using buttons 394, 396, 398 or by removing a certain batch using the corresponding button of column 388, directly in the actual matrix data block 404.

The following information for control of the material feeding installation 10 is included in the matrix data blocks 402, 404 for each batch respectively:

- wet weights to be extracted from each weighing hopper 16-1 . . . 16-n by the associated extractor 18-1 . . . 18-n computed by subroutine "stockhouse weights" set out below according to the batch dataset using the batching proportion and nominal charge quantity for each pre-configured material type;
- material arrangement in/on the conveyor 14, especially on the main conveyor belt (see description of FIG. 16 below), determined using the batching arrangement indicators.

The following information for control of the top-charging installation 10 is included in the actual matrix data blocks 402, 404 for each batch respectively:

- recipe identifier
- batch identifier
- overall material type (O=ferrous, C=coke)
- average burden density (see subroutine "average density")
- total batch weight expected from material feeding installation 10
- chute pivoting direction (start burdening from furnace wall or centre)
- targeted outflow time (total discharge time)
- starting angle (for discharging)
- angle increment (for discharging)
- discharging time per angular pivoting position (see subroutine "time per position")
- discharging weight per angular pivoting position (calculated using a total batch weight measurement $m_{meas}$ and the proportion of time spent at the given position:

$$m_i = \frac{t_i}{\sum t_i} \cdot m_{meas},$$

with $t_i$ as determined below)
 control information for closing material gate valve 28-1, 28-2 between angular pivoting positions (if required)

Figures 15, 16:
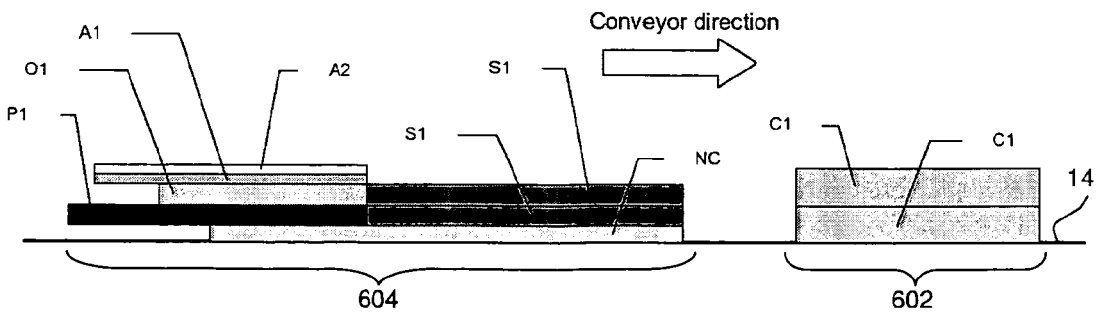
FIG. 15 is a block schematic diagram illustrating data structures used for process control.
FIG. 16 schematically illustrates examples of layered batches provided by the material feeding installation onto a belt-type conveyor.

The above information is derived automatically by the user interface using the top-charging records described hereinbefore. FIG. 15 schematically illustrates exemplary data structures suitable for containing the information for control of the top-charging installation 10. The end of the charging cycle is identified by empty (non-defined) fields in the data structures (or at the last field, e.g. batch number 20).

The user interface implements the following subroutines for generating data for the matrix data blocks, in particular the temporary matrix data block 402.

Subroutine: "Update Matrix"

This subroutine derives, for each batch, information suitable for control of the material feeding installation 10 and the top-charging installation 12 from the batch datasets and the top-charging records currently in memory (as loaded, entered or modified using the batch and the top-charging configuration views). The subroutine converts the values of the relevant data items into suitable format, such as for example a format suitable for use by an (OPC) server and copies such formatted information into respective fields of the temporary matrix data block 402.

Certain values to be copied to the matrix data block 402 need to be computed as follows:

Subroutine: "Time Per Position"

This subroutine calculates the time during which material is to be discharged per angular position of the distribution chute. In "portion based" mode, the user interface calculates the time as follows:

$$t_i = n_i \cdot \frac{60[s]}{RPM}$$

where "$t_i$" is the time to be determined, "RPM" is the rotational speed at which the chute 22 is rotated and "$n_i$" is the value of the array item quota[i] defined in the top-charging record for the respective pivoting position.

In "percent based" mode, the user interface calculates the time as follows:

$$t_i = t \frac{x_i}{100}$$

where "$t_i$" is the time to be determined, "t" is the user-specified total discharge time and "$x_i$" is the value (percentage of weight to be discharged) of the array item quota[i] defined in the top-charging record for the respective pivoting position.

Subroutine: "Average Density"

This subroutine calculates the average density of material for a given batch as follows:

$$\rho = \frac{W}{V}$$

where "W" is the total wet weight of the batch, i.e. the value of the "batch weight" item (see subroutine "wet weight to be extracted") and "V" is the total volume of the batch, i.e. the value of the "batch volume" item (see subroutine "check volume for receiving hopper").

Subroutine: "Stockhouse Weights"

In the proposed preferred embodiment, this subroutine computes, for each batching record defined in a batch dataset, an associated batching quantity, which the material feeding installation 10 is to provide in the pre-configured batch of raw material. To this effect, it uses the value of the batching proportion item and the value of the nominal charge quantity item associated to the respective material type as follows:

$$m_{(i;batch_j)} = m_{(CHARGE,i)} \cdot \frac{\%_{(requested;i)}}{100} \cdot \frac{1}{1 - \frac{\omega_i}{100}}.$$

with "m(i; batch)" being the batching quantity defined in the respective batching record, in particular the wet weight to be extracted, "m(charge, i)" being the nominal charge quantity defined in the respective charge material record, "% (requested, i)" being the batching proportion defined in the respective batching record, and "$\omega i$" being the average humidity of material loaded from the material table. As will be understood, the batching quantity (e.g. in terms of wet weight expressed in kilograms [kg]) is computed only when needed for updating the temporary matrix data block 402 for control purposes and when needed for a check subroutine but not stored in the recipe file used by the user interface to fill in or save the content of the tabular form 128.

Corresponding data of the actual matrix data block 404, after being updated with the contents of the temporary matrix data block 402, is used for controlling operation of the material feeding installation 10 using a control system architecture as illustrated in FIGS. 2-3. Furthermore, data related to top-charging parameters from the matrix data block 404 is used among others to:
 pass control information to the top-charging feeding installation 12 using a control system architecture as illustrated in FIGS. 2-3;
 to determine receiving hopper priorities (in case all hoppers are full or empty);
 to track the material progress on the conveyor 14 from the material feeding installation 10 to the top-charging feeding installation 12.

FIG. 16 schematically illustrates an example of layered batches 602, 604 as provided by the material feeding installation 10 using control information derived from the batching arrangement indicators of respective charge datasets. Reference signs A1, A2, C1, NC, O1, P1 and S1 identify sections of respective material type. The schematically illustrated layering of the batches 602, 604 of FIG. 16 corresponds to batch datasets defined as follows:

| Batch | | 1 | | | 2 | | 3 | | | 4 | | | 5 | | | 6 | | | 7 |
|---|---|---|---|---|---|---|---|---|---|---|---|---|---|---|---|---|---|---|---|
| 1 | | C1 | 50 | + | C1 | 50 | | | | | | | | | | | | | |
| 2 | E | S1 | 50 | + | S1 | 50 | + | NC | 100 | | P1 | 100 | + | O1 | 100 | + | A1 | 100 | + | A2 | 100 | + |
| 3 | | | | | | | | | | | | | | | | | | | |

The batching arrangement indicator for the batching record 1 (column) of batch 1 (row) indicates that two extractors for coke type C1 are to discharge together. Accordingly, a batch 602 with layered sections of material type C1 is batched onto the conveyor 14. In the subsequent batch dataset (row 2), batching arrangement indicators are provided to indicate that discharge of two extractors providing material type S1 and of one extractor providing material type NC is to be carried out jointly. Similarly, batching arrangement indicators are provided to pre-configuring layered sections P1, O1, A1 & A2. Batch 604 corresponds to the pre-configuration by batch dataset 2 (row 2). It may be noted that the first extractor specified in the sequence of sections that are to be discharged in layered manner according to the order of the batching records in the batch dataset is considered as reference extractor. Extraction of the next section(s) starts when the reference extractor has finished.

In conclusion, an exemplary use of the proposed user interface is briefly outlined. The burdening composition (e.g. per ton of hot metal) is set either by the operator manually entering corresponding target quantities or automatically using an external module/database for burdening calculation. Using a reference basis specified by the operator (e.g. coke layer height at furnace throat), the nominal charge quantities, i.e. the amounts of material to be burdened per nominal charge are calculated by the user interface for each requested material type. The operator selects the number of charges to be burdened per charging cycles and defines the composition of each batch by selecting material types (coke, sinter, pellets . . . ) and by affecting a batching proportion, e.g. percentage, of the given material to be included in a batch. If permitted by the stockhouse control system, the operator may specify the arrangement of raw material types on the main conveyor belt. Thereby, all relevant information for a recipe is defined. Recipes can be saved, loaded and edited. The recipe does not require manual updating in case of raw burdening composition change/update (by input of a new burden composition per ton of hot metal), because the batches composition is defined in proportion (e.g. as percentage) of the nominal charge weight. The user interface supports the operator by various checks, e.g. checking that all material types to be charged have been affected to batches and that the receiving hoppers will not be overfilled.

The invention claimed is:

1. A computer-implemented method of controlling a charging of a blast furnace equipped
   with an automated top-charging installation arranged on a throat of said blast furnace and comprising at least one receiving hopper for charging batches of material into said blast furnace and
   with an automated material feeding installation for feeding charge material in batches to said automated top-charging installation,
said method comprising:
   obtaining a nominal charge dataset reflecting a nominal blast furnace charge which complies with a predetermined burden composition aiming at a desired hot metal chemistry, said nominal charge dataset comprising plural charge material records, each charge material record comprising a material type and an associated nominal charge quantity;
   generating a graphical user interface on a display, said graphical user interface comprising:
      batch data fields for entering and displaying plural batch datasets for pre-configuring batches of raw material to be fed to the automated top-charging installation by said automated material feeding installation, each batch being an aggregation of materials to be fed into one receiving hopper, each batch dataset comprising at least one batching record, each batching record comprising a material type and an associated batching proportion for predefining a ratio between quantity to be contained in a batch and nominal charge quantity of the associated material type;
   obtaining one or more batch datasets;
   computing, for the respective material type of each batching record in an obtained batch dataset, by using the batching proportion and the nominal charge quantity associated to the respective material type, an associated batching quantity which said automated material feeding installation is to provide in a batch of raw material pre-configured by said obtained batch dataset; and
   controlling the charging of the blast furnace in accordance with the associated batching quantity.

2. The computer-implemented method according to claim 1, wherein said automated top-charging installation comprises a rotatable and pivotable distribution chute,
   wherein said graphical user interface further comprises top-charging data fields for entering and displaying one or more top-charging parameter records for determining top-charging settings of a batch of raw material pre-configured by a batch dataset associated to the respective top-charging parameter record, each top-charging parameter record comprising multiple chute position quota, each chute position quota corresponding to a different pivoting angle of said distribution chute, for determining a share of a batch to be discharged into the furnace at the corresponding pivoting angle; and
   wherein said method further comprises:
      obtaining one or more top-charging parameter records; and
      storing a recipe file containing said obtained one or more batch datasets and said obtained one or more top-charging parameter records.

3. The computer-implemented method according to claim 1, wherein said method further comprises:
   generating a temporary file, said file comprising for each batching record of said obtained one or more batch datasets, said computed associated batching quantity; and
   using said temporary file for controlling said automated material feeding installation.

4. The computer-implemented method according to claim 1, wherein said method comprises:
   obtaining plural batch datasets;
   obtaining an integer number of charges per charging cycle, said integer number of charges reflecting a number of actual charges to be charged into said blast furnace in accordance with the batches of raw material pre-configured by said obtained plural batch datasets;
   checking, for the respective material type of each charge material record in said obtained nominal charge dataset, whether the sum of all batching proportions associated to the respective material type in said obtained plural batch datasets reflects the whole nominal charge quantity of the respective material type multiplied by the obtained integer number of charges.

5. The computer-implemented method according to claim 1, wherein said graphical user interface further comprises:
   burden composition data fields for entering and displaying a composition dataset aiming at a predetermined chemistry of hot metal to be produced by said blast furnace, said composition dataset comprising plural burdening material records, each burdening material record comprising a material type and an associated target quantity, and
a reference basis data field for entering and displaying a reference basis, in particular a coke layer height, a coke basis or a ferrous basis, to be used for computing nominal charge quantities;
wherein said method further comprises obtaining a composition dataset and obtaining a reference basis; and
wherein obtaining a nominal charge dataset comprises computing, for the respective material type of each burdening material record in said obtained composition dataset, a nominal charge quantity by using the target quantity associated to the respective material type and said obtained reference basis.

6. The computer-implemented method according to claim 3, wherein said graphical user interface further comprises:
burden composition data fields for entering and displaying a composition dataset aiming at a predetermined chemistry of hot metal to be produced by said blast furnace, said composition dataset comprising plural burdening material records, each burdening material record comprising a material type and an associated target quantity, and
a reference basis data field for entering and displaying a reference basis, in particular a coke layer height, a coke basis or a ferrous basis, to be used for computing nominal charge quantities;
wherein said method further comprises obtaining a composition dataset and obtaining a reference basis;
wherein obtaining a nominal charge dataset comprises computing, for the respective material type of each burdening material record in said obtained composition dataset, a nominal charge quantity by using the target quantity associated to the respective material type and said obtained reference basis; and
wherein said stored recipe file further contains said obtained reference basis.

7. The computer-implemented method according to claim 6, wherein said stored recipe file further contains said obtained integer number of charges.

8. The computer-implemented method according to claim 1, wherein each batching record of a batch dataset further comprises an associated batching arrangement indicator for pre-configuring the manner in which said automated material feeding installation is to provide a batch of raw material pre-configured by said batch dataset.

9. The computer-implemented method according to claim 2, wherein each top-charging parameter record further comprises a discharge direction reflecting a pivoting direction of said distribution chute.

10. The computer-implemented method according to claim 9, wherein each top-charging parameter record further comprises a discharge time reflecting a time required for discharging the batch of raw material pre-configured by the batch dataset associated to the respective top-charging parameter record.

11. The computer-implemented method according to claim 1, further comprising at least one of:
checking, for each of said obtained one or more batch datasets, whether the respective material types of each batching record in an obtained batch dataset are compatible;
checking, for each of charge material record of said obtained nominal charge dataset, whether the respective material types are available in said automated material feeding installation;
checking, for each of said obtained one or more batch datasets, whether, for each material type of each batching record in an obtained batch dataset, the batching quantity associated to the respective material type does not exceed the batching capacity of said automated material feeding installation for the respective material type; and
checking, for each of said obtained one or more batch datasets, whether, the batch of raw material pre-configured by an obtained batch dataset does not exceed the receiving capacity of said automated top-charging installation.

12. The computer-implemented method according to claim 8, further comprising, checking, for each of said obtained one or more batch datasets, whether said automated material feeding installation is capable of providing a batch of raw material in the manner pre-configured by an obtained batch dataset.

13. The computer-implemented method according to claim 1, wherein said automated top-charging installation comprises a rotatable and pivotable distribution chute and wherein said graphical user interface further comprises
top-charging data fields for entering and displaying one or more top-charging parameter records for determining the share of a batch to be discharged into the furnace at each of a set of pivoting positions of said distribution chute, and
a graphical bar chart type representation visualizing a respective share of a batch to be discharged for each of said pivoting positions in accordance with said one or more top-charging parameter records.

14. A computer system configured to control a charging of a blast furnace that is equipped with
an automated top-charging installation arranged on a throat of said blast furnace and comprising at least one receiving hopper for charging material into said blast furnace and
an automated material feeding installation for feeding charge material to said automated top-charging installation,
said computer system comprising:
means for obtaining a nominal charge dataset reflecting a nominal blast furnace charge which complies with a predetermined burden composition aiming at a desired hot metal chemistry, said nominal charge dataset comprising plural charge material records, each charge material record comprising a material type and an associated nominal charge quantity;
means for generating a graphical user interface on a display, said graphical user interface comprising:
batch data fields for entering and displaying plural batch datasets for pre-configuring batches of raw material to be fed to the automated top-charging installation by said automated material feeding installation, each batch being an aggregation of materials to be fed into one receiving hopper, each batch dataset comprising at least one batching record, each batching record comprising a material type and an associated batching proportion for predefining a ratio between quantity to be contained in a batch and nominal charge quantity of the associated material type;
means for obtaining one or more batch datasets;
means for computing, for the respective material type of each batching record in an obtained batch dataset, by using the batching proportion and the nominal charge quantity associated to the respective material type, an associated batching quantity which said automated material feeding installation is to provide in a batch of raw material pre-configured by said obtained batch dataset; and means for controlling the charging of the blast furnace in accordance with the associated batching quantity.

15. The computer system according to claim 14, wherein said automated top-charging installation comprises a rotatable and pivotable distribution chute, wherein said graphical user interface further comprises top-charging data fields for entering and displaying one or more top-charging parameter records for determining top-charging settings of a batch of raw material pre-configured by a batch dataset associated to the respective top-charging parameter record, each top-charging parameter record comprising multiple chute position quota, each chute position quota corresponding to a different pivoting angle of said distribution chute, for determining the share of a batch to be discharged into the furnace at the corresponding pivoting angle; and wherein said system further comprises:
 means for obtaining one or more top-charging parameter records; and
 a recipe file containing said obtained one or more batch datasets and said obtained one or more top-charging parameter records.

16. The computer system according to claim 14, wherein said system further comprises:

memory means storing a temporary file, said file comprising, for each batching record of said obtained one or more batch datasets, said computed associated batching quantity; and a process control unit configured for using information derived from said temporary file for controlling said automated material feeding installation.

17. The computer system according to claim 14, wherein said system comprises:

means for obtaining plural batch datasets;

means for obtaining an integer number of charges per charging cycle, said integer number of charges reflecting the number of actual charges to be charged into said blast furnace in accordance with the batches of raw material pre-configured by said obtained plural batch datasets;

means for checking, for the respective material type of each charge material record in said obtained nominal charge dataset, whether the sum of all batching proportions associated to the respective material type in said obtained plural batch datasets reflects the whole nominal charge quantity of the respective material type multiplied by the obtained integer number of charges.

18. The computer system according to claim 14, wherein said graphical user interface further comprises:

burden composition data fields for entering and displaying a composition dataset aiming at a predetermined chemistry of hot metal to be produced by said blast furnace, said composition dataset comprising plural burdening material records, each burdening material record comprising a material type and an associated target quantity, and a reference basis data field for entering and displaying a reference basis, in particular a coke layer height, a coke basis or a ferrous basis, to be used for computing nominal charge quantities;

wherein said system further comprises:
 means for obtaining a composition dataset, and
 means for obtaining a reference basis; and
wherein said means for obtaining a nominal charge dataset comprises means for computing, for the respective material type of each burdening material record in said obtained composition dataset, a nominal charge quantity by using the target quantity associated to the respective material type and said obtained reference basis.

19. The computer system according to claim 16 wherein said graphical user interface further comprises:

burden composition data fields for entering and displaying a composition dataset aiming at a predetermined chemistry of hot metal to be produced by said blast furnace, said composition dataset comprising plural burdening material records, each burdening material record comprising a material type and an associated target quantity, and a reference basis data field for entering and displaying a reference basis, in particular a coke layer height, a coke basis or a ferrous basis, to be used for computing nominal charge quantities;

wherein said system further comprises:
 means for obtaining a composition dataset, and
 means for obtaining a reference basis;
wherein said means for obtaining a nominal charge dataset comprises means for computing, for the respective material type of each burdening material record in said obtained composition dataset, a nominal charge quantity by using the target quantity associated to the respective material type and said obtained reference basis; and
wherein said stored recipe file further contains said obtained reference basis.

20. The computer system according to claim 19, wherein said stored recipe file further contains said obtained integer number of charges.

21. The computer system according to claim 14, wherein each batching record of a batch dataset further comprises an associated batching arrangement indicator for pre-configuring the manner in which said automated material feeding installation is to provide a batch of raw material pre-configured by said batch dataset.

22. The computer system according to claim 15, wherein each top-charging parameter record further comprises a discharge direction reflecting a pivoting direction of said distribution chute.

23. The computer system according to claim 22, wherein each top-charging parameter record further comprises a discharge time reflecting a time required for discharging the batch of raw material pre-configured by the batch dataset associated to the respective top-charging parameter record.

24. The computer system according to claim 14, further comprising at least one of:

means for checking, for each of said obtained one or more batch datasets, whether the respective material types of each batching record in an obtained batch dataset are compatible;

means for checking, for each of charge material record of said obtained nominal charge dataset, whether the respective material types are available in said automated material feeding installation;

means for checking, for each of said obtained one or more batch datasets, whether, for each material type of each batching record in an obtained batch dataset, the batching quantity associated to the respective material type does not exceed the batching capacity of said automated material feeding installation for the respective material type; and means for checking, for each of said obtained one or more batch datasets, whether, the batch of raw material pre-configured by an obtained batch dataset does not exceed the receiving capacity of said top-charging installation.

25. The computer system according to claim 21, further comprising means for checking, for each of said obtained one or more batch datasets, whether said automated material feeding installation is capable of providing a batch of raw material in the manner pre-configured by an obtained batch dataset.

26. The computer system according to claim 14, wherein said automated top-charging installation comprises a rotatable and pivotable distribution chute and wherein said graphical user interface further comprises:

top-charging data fields for entering and displaying one or more top-charging parameter records for determining a share of a batch to be discharged into the furnace at each of a set of pivoting positions of said distribution chute, and a graphical representation of the bar chart type visualizing the respective share of a batch to be discharged for each of said pivoting positions in accordance with said one or more top-charging parameter records.

27. A computer program product, the computer program product comprising a non-transitory computer readable storage medium having computer implementable instructions embodied therewith, the computer implementable instructions for controlling a charging of a blast furnace equipped with an automated top-charging installation arranged on a throat of said blast furnace and comprising at least one receiving hopper for charging batches of material into said blast furnace and with an automated material feeding installation for feeding charge material in batches to said automated top-charging installation, the computer implementable instructions executable by the computer system to cause the controlling by:

obtaining a nominal charge dataset reflecting a nominal blast furnace charge which complies with a predetermined burden composition aiming at a desired hot metal chemistry, said nominal charge dataset comprising plural charge material records, each charge material record comprising a material type and an associated nominal charge quantity;

generating a graphical user interface on a display, said graphical user interface comprising:

batch data fields for entering and displaying plural batch datasets for pre-configuring batches of raw material to be fed to the automated top-charging installation by said automated material feeding installation, each batch being an aggregation of materials to be fed into one receiving hopper, each batch dataset comprising at least one batching record, each batching record comprising a material type and an associated batching proportion for predefining a ratio between quantity to be contained in a batch and nominal charge quantity of the associated material type;

obtaining one or more batch datasets; and computing, for the respective material type of each batching record in an obtained batch dataset, by using the batching proportion and the nominal charge quantity associated to the respective material type, an associated batching quantity which said automated material feeding installation is to provide in a batch of raw material pre-configured by said obtained batch dataset and controlling the charging of the blast furnace in accordance with the associated batching quantity.

\* \* \* \* \*